United States Patent
Grau et al.

(10) Patent No.: US 9,638,507 B2
(45) Date of Patent: May 2, 2017

(54) MEASUREMENT MACHINE UTILIZING A BARCODE TO IDENTIFY AN INSPECTION PLAN FOR AN OBJECT

(71) Applicant: FARO Technologies, Inc., Lake Mary, FL (US)

(72) Inventors: Markus Grau, Korntal-Muenchingen (DE); David H. Parker, Earlysville, VA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 1138 days.

(21) Appl. No.: 13/746,741

(22) Filed: Jan. 22, 2013

(65) Prior Publication Data
US 2013/0197852 A1    Aug. 1, 2013

Related U.S. Application Data

(60) Provisional application No. 61/591,290, filed on Jan. 27, 2012.

(51) Int. Cl.
*G01B 5/008* (2006.01)
*G06F 17/00* (2006.01)
*G01B 11/03* (2006.01)

(52) U.S. Cl.
CPC .............. *G01B 5/008* (2013.01); *G01B 11/03* (2013.01); *G06F 17/00* (2013.01); *G05B 2219/36018* (2013.01); *G05B 2219/36369* (2013.01)

(58) Field of Classification Search
CPC ......... G01B 5/008; G01B 11/03; G06F 17/00; G05B 2219/36369; G05B 2219/36018
See application file for complete search history.

(56) References Cited

U.S. PATENT DOCUMENTS

| | | | |
|---|---|---|---|
| 2,612,994 | A | 10/1952 | Woodland |
| 2,682,804 | A | 7/1954 | Clifford et al. |
| 2,484,641 | A | 3/1957 | Keuffel et al. |
| 2,784,641 | A | 3/1957 | Keuffel et al. |
| 3,339,457 | A | 9/1967 | Pun |
| 3,365,717 | A | 1/1968 | Holscher |

(Continued)

FOREIGN PATENT DOCUMENTS

| | | |
|---|---|---|
| CA | 2811444 | 3/2012 |
| CH | 589856 A5 | 7/1977 |

(Continued)

OTHER PUBLICATIONS

"A New Generation of Total Stations from Leica Geosystems." K. Zeiske. Leica Geosystems AG, May 1999, 8 pages.

(Continued)

*Primary Examiner* — Mohamed Charioui
*Assistant Examiner* — Jeremy Delozier
(74) *Attorney, Agent, or Firm* — Cantor Colburn LLP

(57) ABSTRACT

Embodiments of the present invention relate to a measurement machine for measuring an object, and more particularly to a measurement machine such as a portable articulated arm coordinate measuring machine or a laser tracker that measures an object according to a measurement or inspection plan that is identified by a machine readable information symbol located on the object to be measured or on a drawing (e.g., a CAD drawing) of the object.

20 Claims, 21 Drawing Sheets

(56) References Cited

U.S. PATENT DOCUMENTS

| | | |
|---|---|---|
| 3,464,770 A | 9/1969 | Schmidt |
| 3,497,695 A | 2/1970 | Smith et al. |
| 3,508,828 A | 4/1970 | Froome et al. |
| 3,619,058 A | 11/1971 | Hewlett et al. |
| 3,627,429 A | 12/1971 | Jaenicke et al. |
| 3,658,426 A | 4/1972 | Vyce |
| 3,728,025 A | 4/1973 | Madigan et al. |
| 3,740,141 A | 6/1973 | DeWitt, Jr. |
| 3,779,645 A | 12/1973 | Nakazawa et al. |
| 3,813,165 A | 5/1974 | Hines et al. |
| 3,832,056 A | 8/1974 | Shipp et al. |
| 3,900,260 A | 8/1975 | Wendt |
| 3,914,052 A | 10/1975 | Wiklund |
| 4,113,381 A | 9/1978 | Epstein |
| 4,178,515 A | 12/1979 | Tarasevich |
| 4,297,030 A | 10/1981 | Chaborski |
| 4,403,857 A | 9/1983 | Holscher |
| 4,413,907 A | 11/1983 | Lane |
| 4,453,825 A | 6/1984 | Buck et al. |
| 4,498,764 A | 2/1985 | Bolkow et al. |
| 4,521,107 A | 6/1985 | Chaborski et al. |
| 4,531,833 A | 7/1985 | Ohtomo |
| 4,537,475 A | 8/1985 | Summers et al. |
| 4,560,270 A | 12/1985 | Wiklund et al. |
| 4,632,547 A | 12/1986 | Kaplan et al. |
| 4,652,130 A | 3/1987 | Tank |
| 4,689,489 A | 8/1987 | Cole |
| 4,692,023 A | 9/1987 | Ohtomo et al. |
| 4,699,508 A | 10/1987 | Bolkow et al. |
| 4,707,129 A | 11/1987 | Hashimoto et al. |
| 4,714,339 A | 12/1987 | Lau et al. |
| 4,731,812 A | 3/1988 | Akerberg |
| 4,731,879 A | 3/1988 | Sepp et al. |
| 4,767,257 A | 8/1988 | Kato |
| 4,777,660 A | 10/1988 | Gould et al. |
| 4,790,651 A | 12/1988 | Brown et al. |
| 4,839,507 A | 6/1989 | May |
| 4,983,021 A | 1/1991 | Fergason |
| 5,002,388 A | 3/1991 | Ohishi et al. |
| 5,051,934 A | 9/1991 | Wiklund |
| 5,069,524 A | 12/1991 | Watanabe et al. |
| 5,082,364 A | 1/1992 | Russell |
| 5,090,131 A | 2/1992 | Deer |
| 5,121,242 A | 6/1992 | Kennedy |
| 5,137,354 A | 8/1992 | Devos et al. |
| 5,138,154 A | 8/1992 | Hotelling |
| 5,162,862 A | 11/1992 | Bartram et al. |
| 5,198,868 A | 3/1993 | Saito et al. |
| 5,237,384 A | 8/1993 | Fukunaga et al. |
| 5,263,103 A | 11/1993 | Kosinski |
| 5,267,014 A | 11/1993 | Prenninger |
| 5,301,005 A | 4/1994 | Devos et al. |
| 5,313,409 A | 5/1994 | Wiklund et al. |
| 5,319,434 A | 6/1994 | Croteau et al. |
| 5,347,306 A | 9/1994 | Nitta |
| 5,392,521 A | 2/1995 | Allen |
| 5,400,130 A | 3/1995 | Tsujimoto et al. |
| 5,402,193 A | 3/1995 | Choate |
| 5,416,321 A | 5/1995 | Sebastian et al. |
| 5,440,112 A | 8/1995 | Sakimura et al. |
| 5,440,326 A | 8/1995 | Quinn |
| 5,448,505 A | 9/1995 | Novak |
| 5,455,670 A | 10/1995 | Payne et al. |
| 5,532,816 A | 7/1996 | Spann et al. |
| 5,534,992 A | 7/1996 | Takeshima et al. |
| 5,594,169 A | 1/1997 | Field et al. |
| D378,751 S | 4/1997 | Smith |
| 5,671,160 A | 9/1997 | Julian |
| 5,698,784 A | 12/1997 | Hotelling et al. |
| 5,724,264 A | 3/1998 | Rosenberg et al. |
| 5,737,068 A | 4/1998 | Kaneko et al. |
| 5,742,379 A | 4/1998 | Reifer |
| 5,754,284 A | 5/1998 | Leblanc et al. |
| 5,764,360 A | 6/1998 | Meier |
| 5,767,952 A | 6/1998 | Ohtomo et al. |
| 5,771,623 A | 6/1998 | Pernstich et al. |
| 5,817,243 A | 10/1998 | Shaffer |
| 5,825,350 A | 10/1998 | Case, Jr. et al. |
| 5,828,057 A | 10/1998 | Hertzman et al. |
| 5,861,956 A | 1/1999 | Bridges et al. |
| 5,880,822 A | 3/1999 | Kubo |
| 5,886,775 A | 3/1999 | Houser et al. |
| 5,886,777 A | 3/1999 | Hirunuma |
| 5,892,575 A | 4/1999 | Marino |
| 5,893,214 A | 4/1999 | Meier et al. |
| 5,898,421 A | 4/1999 | Quinn |
| 5,926,388 A | 7/1999 | Kimbrough et al. |
| 5,930,030 A | 7/1999 | Scifres |
| 5,957,559 A | 9/1999 | Rueb et al. |
| 5,973,788 A | 10/1999 | Pettersen et al. |
| 5,991,011 A | 11/1999 | Damm |
| 6,017,125 A | 1/2000 | Vann |
| 6,023,326 A | 2/2000 | Katayama et al. |
| 6,034,722 A | 3/2000 | Viney et al. |
| 6,036,319 A | 3/2000 | Rueb et al. |
| 6,052,190 A | 4/2000 | Sekowski et al. |
| D427,087 S | 6/2000 | Kaneko et al. |
| 6,085,155 A | 7/2000 | Hayase et al. |
| 6,097,491 A | 8/2000 | Hartrumpf |
| 6,097,897 A | 8/2000 | Ide |
| 6,100,540 A | 8/2000 | Ducharme et al. |
| 6,111,563 A | 8/2000 | Hines |
| 6,122,058 A | 9/2000 | Van Der Werf et al. |
| 6,133,998 A | 10/2000 | Monz et al. |
| 6,166,809 A | 12/2000 | Pettersen et al. |
| 6,171,018 B1 | 1/2001 | Ohtomo et al. |
| 6,193,371 B1 | 2/2001 | Snook |
| 6,222,465 B1 | 4/2001 | Kumar et al. |
| 6,262,801 B1 | 7/2001 | Shibuya et al. |
| 6,295,174 B1 | 9/2001 | Ishinabe et al. |
| 6,317,954 B1 | 11/2001 | Cunningham et al. |
| 6,324,024 B1 | 11/2001 | Shirai et al. |
| 6,330,379 B1 | 12/2001 | Hendriksen |
| 6,344,846 B1 | 2/2002 | Hines |
| 6,347,290 B1 | 2/2002 | Bartlett |
| 6,351,483 B1 | 2/2002 | Chen |
| 6,353,764 B1 | 3/2002 | Imagawa et al. |
| 6,369,794 B1 | 4/2002 | Sakurai et al. |
| 6,369,880 B1 | 4/2002 | Steinlechner |
| 6,433,866 B1 | 8/2002 | Nichols |
| 6,437,859 B1 | 8/2002 | Ohtomo et al. |
| 6,445,446 B1 | 9/2002 | Kumagai et al. |
| 6,462,810 B1 | 10/2002 | Muraoka et al. |
| 6,463,393 B1 | 10/2002 | Giger |
| 6,490,027 B1 | 12/2002 | Rajchel et al. |
| 6,501,543 B2 | 12/2002 | Hedges et al. |
| 6,532,060 B1 | 3/2003 | Kindaichi et al. |
| 6,559,931 B2 | 5/2003 | Kawamura et al. |
| 6,563,569 B2 | 5/2003 | Osawa et al. |
| 6,567,101 B1 | 5/2003 | Thomas |
| 6,573,883 B1 | 6/2003 | Bartlett |
| 6,573,981 B2 | 6/2003 | Kumagai et al. |
| 6,583,862 B1 | 6/2003 | Perger |
| 6,587,244 B1 | 7/2003 | Ishinabe et al. |
| 6,611,617 B1 | 8/2003 | Crampton |
| 6,624,916 B1 | 9/2003 | Green et al. |
| 6,630,993 B1 | 10/2003 | Hedges et al. |
| 6,633,367 B2 | 10/2003 | Gogolla |
| 6,646,732 B2 | 11/2003 | Ohtomo et al. |
| 6,650,222 B2 | 11/2003 | Darr |
| 6,667,798 B1 | 12/2003 | Markendorf et al. |
| 6,668,466 B1 | 12/2003 | Bieg et al. |
| 6,678,059 B2 | 1/2004 | Cho et al. |
| 6,681,031 B2 | 1/2004 | Cohen et al. |
| 6,727,984 B2 | 4/2004 | Becht |
| 6,727,985 B2 | 4/2004 | Giger |
| 6,765,653 B2 | 7/2004 | Shirai et al. |
| 6,802,133 B2 | 10/2004 | Jordil et al. |
| 6,847,436 B2 | 1/2005 | Bridges |
| 6,859,744 B2 | 2/2005 | Giger |
| 6,864,966 B2 | 3/2005 | Giger |
| 6,935,036 B2 | 8/2005 | Raab |
| 6,957,493 B2 | 10/2005 | Kumagai et al. |
| 6,964,113 B2 | 11/2005 | Bridges et al. |

(56) References Cited

U.S. PATENT DOCUMENTS

| | | |
|---|---|---|
| 6,965,843 B2 | 11/2005 | Raab et al. |
| 6,980,881 B2 | 12/2005 | Greenwood et al. |
| 6,996,912 B2 | 2/2006 | Raab |
| 6,996,914 B1 | 2/2006 | Istre et al. |
| 7,022,971 B2 | 4/2006 | Ura et al. |
| 7,023,531 B2 | 4/2006 | Gogolla et al. |
| 7,055,253 B2 | 6/2006 | Kaneko |
| 7,072,032 B2 | 7/2006 | Kumagai et al. |
| 7,086,169 B1 | 8/2006 | Bayham et al. |
| 7,095,490 B2 | 8/2006 | Ohtomo et al. |
| 7,099,000 B2 | 8/2006 | Connolly |
| 7,129,927 B2 | 10/2006 | Mattsson |
| 7,130,035 B2 | 10/2006 | Ohtomo et al. |
| 7,168,174 B2 | 1/2007 | Piekutowski |
| 7,177,014 B2 | 2/2007 | Mori et al. |
| 7,193,695 B2 | 3/2007 | Sugiura |
| 7,196,776 B2 | 3/2007 | Ohtomo et al. |
| 7,222,021 B2 | 5/2007 | Ootomo et al. |
| 7,224,444 B2 | 5/2007 | Stierle et al. |
| 7,230,689 B2 | 6/2007 | Lau |
| 7,233,316 B2 | 6/2007 | Smith et al. |
| 7,246,030 B2 | 7/2007 | Raab et al. |
| 7,248,374 B2 | 7/2007 | Bridges |
| 7,253,891 B2 | 8/2007 | Toker et al. |
| 7,256,899 B1 | 8/2007 | Faul et al. |
| 7,262,863 B2 | 8/2007 | Schmidt et al. |
| 7,274,802 B2 | 9/2007 | Kumagai et al. |
| 7,285,793 B2 | 10/2007 | Husted |
| 7,286,246 B2 | 10/2007 | Yoshida |
| 7,304,729 B2 | 12/2007 | Yasutomi et al. |
| 7,307,710 B2 | 12/2007 | Gatsios et al. |
| 7,312,862 B2 | 12/2007 | Zumbrunn et al. |
| 7,321,420 B2 | 1/2008 | Yasutomi et al. |
| 7,325,326 B1 | 2/2008 | Istre et al. |
| 7,327,446 B2 | 2/2008 | Cramer et al. |
| 7,336,346 B2 | 2/2008 | Aoki et al. |
| 7,336,375 B1 | 2/2008 | Faul et al. |
| 7,339,655 B2 | 3/2008 | Nakamura et al. |
| 7,345,748 B2 | 3/2008 | Sugiura et al. |
| 7,352,446 B2 | 4/2008 | Bridges et al. |
| 7,372,558 B2 | 5/2008 | Kaufman et al. |
| 7,388,654 B2 | 6/2008 | Raab et al. |
| 7,388,658 B2 | 6/2008 | Glimm |
| 7,401,783 B2 | 7/2008 | Pryor |
| 7,423,742 B2 | 9/2008 | Gatsios et al. |
| 7,429,112 B2 | 9/2008 | Metcalfe |
| 7,446,863 B2 | 11/2008 | Nishita et al. |
| 7,453,554 B2 | 11/2008 | Yang et al. |
| 7,466,401 B2 | 12/2008 | Cramer et al. |
| 7,471,377 B2 | 12/2008 | Liu et al. |
| 7,474,388 B2 | 1/2009 | Ohtomo et al. |
| 7,480,037 B2 | 1/2009 | Palmateer et al. |
| 7,492,444 B2 | 2/2009 | Osada |
| 7,503,123 B2 | 3/2009 | Matsuo et al. |
| 7,511,824 B2 | 3/2009 | Sebastian et al. |
| 7,518,709 B2 | 4/2009 | Oishi et al. |
| 7,535,555 B2 | 5/2009 | Nishizawa et al. |
| 7,541,965 B2 | 6/2009 | Ouchi et al. |
| 7,552,539 B2 | 6/2009 | Piekutowski |
| 7,555,766 B2 | 6/2009 | Kondo et al. |
| 7,562,459 B2 | 7/2009 | Fourquin et al. |
| 7,564,538 B2 | 7/2009 | Sakimura et al. |
| 7,565,216 B2 | 7/2009 | Soucy |
| 7,583,375 B2 | 9/2009 | Cramer et al. |
| 7,586,586 B2 | 9/2009 | Constantikes |
| 7,613,501 B2 | 11/2009 | Scherch |
| 7,614,019 B2 | 11/2009 | Rimas Ribikauskas et al. |
| D605,959 S | 12/2009 | Apotheloz |
| 7,634,374 B2 | 12/2009 | Chouinard et al. |
| 7,634,381 B2 | 12/2009 | Westermark et al. |
| 7,692,628 B2 | 4/2010 | Smith et al. |
| 7,701,559 B2 | 4/2010 | Bridges et al. |
| 7,701,566 B2 | 4/2010 | Kumagai et al. |
| 7,705,830 B2 | 4/2010 | Westerman et al. |
| 7,710,396 B2 | 5/2010 | Smith et al. |
| 7,724,380 B2 | 5/2010 | Horita et al. |
| 7,728,963 B2 | 6/2010 | Kirschner |
| 7,738,083 B2 | 6/2010 | Luo et al. |
| 7,751,654 B2 | 7/2010 | Lipson et al. |
| 7,761,814 B2 | 7/2010 | Rimas-Ribikauskas et al. |
| 7,765,084 B2 | 7/2010 | Westermark et al. |
| 7,782,298 B2 | 8/2010 | Smith et al. |
| 7,800,758 B1 | 9/2010 | Bridges et al. |
| 7,804,051 B2 | 9/2010 | Hingerling et al. |
| 7,804,602 B2 | 9/2010 | Raab |
| 7,812,736 B2 | 10/2010 | Collingwood et al. |
| 7,812,969 B2 | 10/2010 | Morimoto et al. |
| D629,314 S | 12/2010 | Ogasawara |
| 7,876,457 B2 | 1/2011 | Rueb |
| 7,894,079 B1 | 2/2011 | Altendorf et al. |
| 7,903,237 B1 | 3/2011 | Li |
| 7,929,150 B1 | 4/2011 | Schweiger |
| 7,954,250 B2 | 6/2011 | Crampton |
| 7,976,387 B2 | 7/2011 | Venkatesh et al. |
| 7,983,872 B2 | 7/2011 | Makino et al. |
| 7,990,523 B2 | 8/2011 | Schlierbach et al. |
| 7,990,550 B2 | 8/2011 | Aebischer et al. |
| 8,087,315 B2 | 1/2012 | Goossen et al. |
| 8,094,121 B2 | 1/2012 | Obermeyer et al. |
| 8,094,212 B2 | 1/2012 | Jelinek |
| 8,125,629 B2 | 2/2012 | Dold et al. |
| 8,151,477 B2 | 4/2012 | Tait |
| 8,190,030 B2 | 5/2012 | Leclair et al. |
| 8,217,893 B2 | 7/2012 | Quinn et al. |
| 8,237,934 B1 | 8/2012 | Cooke et al. |
| 8,244,023 B2 | 8/2012 | Yamada |
| 8,279,430 B2 | 10/2012 | Dold et al. |
| 8,314,939 B2 | 11/2012 | Kato |
| 8,320,708 B2 | 11/2012 | Kurzweil et al. |
| 8,360,240 B2 | 1/2013 | Kallabis |
| 8,379,224 B1 | 2/2013 | Piasse et al. |
| 8,387,961 B2 | 3/2013 | Im |
| 8,405,604 B2 | 3/2013 | Pryor et al. |
| 8,422,034 B2 | 4/2013 | Steffensen et al. |
| 8,437,011 B2 | 5/2013 | Steffensen et al. |
| 8,438,747 B2 | 5/2013 | Ferrari |
| 8,467,071 B2 | 6/2013 | Steffey et al. |
| 8,467,072 B2 | 6/2013 | Cramer et al. |
| 8,483,512 B2 | 7/2013 | Moeller |
| 8,509,949 B2 | 8/2013 | Bordyn et al. |
| 8,525,983 B2 | 9/2013 | Bridges et al. |
| 8,537,371 B2 | 9/2013 | Steffensen et al. |
| 8,537,375 B2 | 9/2013 | Steffensen et al. |
| 8,553,212 B2 | 10/2013 | Jaeger et al. |
| 8,593,648 B2 | 11/2013 | Cramer et al. |
| 8,619,265 B2 | 12/2013 | Steffey et al. |
| 8,630,314 B2 | 1/2014 | York |
| 8,638,984 B2 | 1/2014 | Roithmeier |
| 8,654,354 B2 | 2/2014 | Steffensen et al. |
| 8,659,749 B2 | 2/2014 | Bridges |
| 8,670,114 B2 | 3/2014 | Bridges et al. |
| 8,681,317 B2 | 3/2014 | Moser et al. |
| 8,699,756 B2 | 4/2014 | Jensen |
| 8,717,545 B2 | 5/2014 | Sebastian et al. |
| 8,740,396 B2 | 6/2014 | Brown et al. |
| 8,772,719 B2 | 7/2014 | Böckem et al. |
| 8,773,667 B2 | 7/2014 | Edmonds et al. |
| 8,848,203 B2 | 9/2014 | Bridges et al. |
| 8,874,406 B2 | 10/2014 | Rotvold et al. |
| 8,902,408 B2 | 12/2014 | Bridges |
| 8,931,183 B2 | 1/2015 | Jonas |
| 9,151,830 B2 | 10/2015 | Bridges |
| 9,207,309 B2 | 12/2015 | Bridges |
| 2001/0045534 A1 | 11/2001 | Kimura |
| 2002/0033940 A1 | 3/2002 | Hedges et al. |
| 2002/0093646 A1 | 7/2002 | Muraoka |
| 2002/0148133 A1 | 10/2002 | Bridges et al. |
| 2002/0179866 A1 | 12/2002 | Hoeller et al. |
| 2003/0014212 A1 | 1/2003 | Ralston et al. |
| 2003/0020895 A1 | 1/2003 | Bridges |
| 2003/0033041 A1 | 2/2003 | Richey |
| 2003/0035195 A1 | 2/2003 | Blech et al. |
| 2003/0066202 A1 | 4/2003 | Eaton |
| 2003/0090682 A1 | 5/2003 | Gooch et al. |

(56) References Cited

U.S. PATENT DOCUMENTS

| | | |
|---|---|---|
| 2003/0125901 A1 | 7/2003 | Steffey et al. |
| 2003/0133092 A1 | 7/2003 | Rogers |
| 2003/0179362 A1 | 9/2003 | Osawa et al. |
| 2003/0206285 A1 | 11/2003 | Lau |
| 2003/0227616 A1 | 12/2003 | Bridges |
| 2004/0035277 A1 | 2/2004 | Hubbs |
| 2004/0075823 A1 | 4/2004 | Lewis et al. |
| 2004/0100705 A1 | 5/2004 | Hubbs |
| 2004/0170363 A1 | 9/2004 | Angela |
| 2004/0189944 A1 | 9/2004 | Kaufman et al. |
| 2004/0218104 A1 | 11/2004 | Smith et al. |
| 2004/0223139 A1 | 11/2004 | Vogel |
| 2005/0058179 A1 | 3/2005 | Phipps |
| 2005/0147477 A1 | 7/2005 | Clark |
| 2005/0179890 A1 | 8/2005 | Cramer et al. |
| 2005/0185182 A1 | 8/2005 | Raab et al. |
| 2005/0197145 A1 | 9/2005 | Chae et al. |
| 2005/0254043 A1 | 11/2005 | Chiba |
| 2005/0284937 A1 | 12/2005 | Xi et al. |
| 2006/0009929 A1 | 1/2006 | Boyette et al. |
| 2006/0053647 A1 | 3/2006 | Raab et al. |
| 2006/0055662 A1 | 3/2006 | Rimas-Ribikauskas et al. |
| 2006/0055685 A1 | 3/2006 | Rimas-Ribikauskas et al. |
| 2006/0066836 A1 | 3/2006 | Bridges et al. |
| 2006/0103853 A1 | 5/2006 | Palmateer |
| 2006/0132803 A1 | 6/2006 | Clair et al. |
| 2006/0140473 A1 | 6/2006 | Brooksby et al. |
| 2006/0141435 A1 | 6/2006 | Chiang |
| 2006/0145703 A1 | 7/2006 | Steinbichler et al. |
| 2006/0146009 A1 | 7/2006 | Syrbe et al. |
| 2006/0161379 A1 | 7/2006 | Ellenby et al. |
| 2006/0164384 A1 | 7/2006 | Smith et al. |
| 2006/0164385 A1 | 7/2006 | Smith et al. |
| 2006/0164386 A1 | 7/2006 | Smith et al. |
| 2006/0222237 A1 | 10/2006 | Du et al. |
| 2006/0222314 A1 | 10/2006 | Zumbrunn et al. |
| 2006/0235611 A1* | 10/2006 | Deaton ............ G01C 15/00 701/491 |
| 2006/0262001 A1 | 11/2006 | Ouchi et al. |
| 2006/0279246 A1 | 12/2006 | Hashimoto et al. |
| 2007/0016386 A1 | 1/2007 | Husted |
| 2007/0019212 A1 | 1/2007 | Gatsios et al. |
| 2007/0024842 A1 | 2/2007 | Nishizawa et al. |
| 2007/0121095 A1 | 5/2007 | Lewis |
| 2007/0127013 A1 | 6/2007 | Hertzman et al. |
| 2007/0130785 A1 | 6/2007 | Bublitz et al. |
| 2007/0236452 A1 | 10/2007 | Venkatesh et al. |
| 2007/0247615 A1 | 10/2007 | Bridges et al. |
| 2007/0285672 A1 | 12/2007 | Mukai et al. |
| 2008/0002866 A1 | 1/2008 | Fujiwara |
| 2008/0024795 A1 | 1/2008 | Yamamoto et al. |
| 2008/0043409 A1 | 2/2008 | Kallabis |
| 2008/0107305 A1 | 5/2008 | Vanderkooy et al. |
| 2008/0122786 A1 | 5/2008 | Pryor et al. |
| 2008/0203299 A1 | 8/2008 | Kozuma et al. |
| 2008/0229592 A1 | 9/2008 | Hinderling et al. |
| 2008/0239281 A1 | 10/2008 | Bridges |
| 2008/0246974 A1 | 10/2008 | Wilson et al. |
| 2008/0250659 A1 | 10/2008 | Bellerose et al. |
| 2008/0279446 A1 | 11/2008 | Hassebrook et al. |
| 2008/0297808 A1 | 12/2008 | Riza et al. |
| 2008/0302200 A1 | 12/2008 | Tobey |
| 2008/0309949 A1 | 12/2008 | Rueb |
| 2008/0316497 A1 | 12/2008 | Taketomi et al. |
| 2008/0316503 A1 | 12/2008 | Smarsh et al. |
| 2009/0000136 A1 | 1/2009 | Crampton |
| 2009/0009747 A1 | 1/2009 | Wolf et al. |
| 2009/0033621 A1 | 2/2009 | Quinn et al. |
| 2009/0046271 A1 | 2/2009 | Constantikes |
| 2009/0066932 A1 | 3/2009 | Bridges et al. |
| 2009/0109426 A1 | 4/2009 | Cramer et al. |
| 2009/0153817 A1 | 6/2009 | Kawakubo |
| 2009/0157226 A1 | 6/2009 | De Smet |
| 2009/0171618 A1 | 7/2009 | Kumagai et al. |
| 2009/0187373 A1 | 7/2009 | Atwell et al. |
| 2009/0190125 A1 | 7/2009 | Foster et al. |
| 2009/0205088 A1 | 8/2009 | Crampton et al. |
| 2009/0213073 A1 | 8/2009 | Obermeyer et al. |
| 2009/0239581 A1 | 9/2009 | Lee |
| 2009/0240372 A1 | 9/2009 | Bordyn et al. |
| 2009/0240461 A1 | 9/2009 | Makino et al. |
| 2009/0240462 A1 | 9/2009 | Lee |
| 2009/0244277 A1 | 10/2009 | Nagashima et al. |
| 2009/0260240 A1 | 10/2009 | Bernhard |
| 2010/0008543 A1 | 1/2010 | Yamada et al. |
| 2010/0058252 A1 | 3/2010 | Ko |
| 2010/0091112 A1 | 4/2010 | Veeser et al. |
| 2010/0095542 A1* | 4/2010 | Ferrari ............ G01B 5/012 33/503 |
| 2010/0103431 A1 | 4/2010 | Demopoulos |
| 2010/0128259 A1 | 5/2010 | Bridges et al. |
| 2010/0149518 A1 | 6/2010 | Nordenfelt et al. |
| 2010/0149525 A1 | 6/2010 | Lau |
| 2010/0158361 A1 | 6/2010 | Grafinger et al. |
| 2010/0176270 A1 | 7/2010 | Lau et al. |
| 2010/0207938 A1 | 8/2010 | Yau et al. |
| 2010/0225746 A1 | 9/2010 | Shpunt et al. |
| 2010/0234094 A1 | 9/2010 | Gagner et al. |
| 2010/0235786 A1 | 9/2010 | Maizels et al. |
| 2010/0245851 A1 | 9/2010 | Teodorescu |
| 2010/0250175 A1 | 9/2010 | Briggs et al. |
| 2010/0250188 A1 | 9/2010 | Brown |
| 2010/0251148 A1 | 9/2010 | Brown |
| 2010/0265316 A1 | 10/2010 | Sali et al. |
| 2010/0277747 A1 | 11/2010 | Rueb et al. |
| 2010/0284082 A1 | 11/2010 | Shpunt et al. |
| 2010/0299103 A1 | 11/2010 | Yoshikawa |
| 2011/0001958 A1 | 1/2011 | Bridges et al. |
| 2011/0003507 A1 | 1/2011 | Van Swearingen et al. |
| 2011/0007154 A1 | 1/2011 | Vogel et al. |
| 2011/0013281 A1 | 1/2011 | Mimura et al. |
| 2011/0023578 A1 | 2/2011 | Grasser |
| 2011/0025827 A1 | 2/2011 | Shpunt et al. |
| 2011/0032509 A1 | 2/2011 | Bridges |
| 2011/0035952 A1 | 2/2011 | Roithmeier |
| 2011/0043620 A1 | 2/2011 | Svanholm et al. |
| 2011/0052006 A1 | 3/2011 | Gurman et al. |
| 2011/0069322 A1 | 3/2011 | Hoffer, Jr. |
| 2011/0107611 A1 | 5/2011 | Desforges et al. |
| 2011/0107612 A1 | 5/2011 | Ferrari et al. |
| 2011/0107613 A1 | 5/2011 | Tait |
| 2011/0107614 A1 | 5/2011 | Champ |
| 2011/0109502 A1 | 5/2011 | Sullivan |
| 2011/0112786 A1 | 5/2011 | Desforges et al. |
| 2011/0123097 A1 | 5/2011 | Van Coppenolle et al. |
| 2011/0128625 A1 | 6/2011 | Larsen et al. |
| 2011/0166824 A1 | 7/2011 | Haisty et al. |
| 2011/0169924 A1 | 7/2011 | Haisty et al. |
| 2011/0170534 A1 | 7/2011 | York |
| 2011/0173827 A1 | 7/2011 | Bailey et al. |
| 2011/0175745 A1 | 7/2011 | Atwell et al. |
| 2011/0176145 A1 | 7/2011 | Edmonds et al. |
| 2011/0179281 A1 | 7/2011 | Chevallier-Mames et al. |
| 2011/0181872 A1 | 7/2011 | Dold et al. |
| 2011/0260033 A1 | 10/2011 | Steffensen et al. |
| 2011/0301902 A1 | 12/2011 | Panagas et al. |
| 2012/0050255 A1 | 3/2012 | Thomas et al. |
| 2012/0065928 A1 | 3/2012 | Rotvold et al. |
| 2012/0099117 A1 | 4/2012 | Hanchett et al. |
| 2012/0105821 A1 | 5/2012 | Moser et al. |
| 2012/0120391 A1 | 5/2012 | Dold et al. |
| 2012/0120415 A1 | 5/2012 | Steffensen et al. |
| 2012/0124850 A1 | 5/2012 | Ortleb et al. |
| 2012/0188559 A1 | 7/2012 | Becker et al. |
| 2012/0206716 A1 | 8/2012 | Cramer et al. |
| 2012/0206808 A1 | 8/2012 | Brown et al. |
| 2012/0218563 A1 | 8/2012 | Spruck et al. |
| 2012/0262550 A1 | 10/2012 | Bridges |
| 2012/0262573 A1 | 10/2012 | Bridges et al. |
| 2012/0262728 A1 | 10/2012 | Bridges et al. |
| 2012/0265479 A1 | 10/2012 | Bridges et al. |
| 2012/0317826 A1 | 12/2012 | Jonas |
| 2013/0037694 A1 | 2/2013 | Steffensen et al. |
| 2013/0096873 A1 | 4/2013 | Rosengaus et al. |

(56) References Cited

U.S. PATENT DOCUMENTS

| | | |
|---|---|---|
| 2013/0100282 A1 | 4/2013 | Siercks et al. |
| 2013/0128284 A1 | 5/2013 | Steffey et al. |
| 2013/0155386 A1 | 6/2013 | Bridges et al. |
| 2013/0162469 A1 | 6/2013 | Zogg et al. |
| 2013/0201470 A1 | 8/2013 | Cramer et al. |
| 2013/0293684 A1 | 11/2013 | Becker et al. |
| 2014/0002806 A1 | 1/2014 | Buchel et al. |
| 2014/0028805 A1 | 1/2014 | Tohme et al. |
| 2014/0267629 A1 | 9/2014 | Tohme et al. |
| 2014/0320643 A1 | 10/2014 | Markendorf |
| 2015/0331159 A1 | 11/2015 | Bridges et al. |
| 2015/0365653 A1 | 12/2015 | Tohme et al. |
| 2015/0373321 A1 | 12/2015 | Bridges |

FOREIGN PATENT DOCUMENTS

| | | |
|---|---|---|
| CN | 1263807 A | 8/2000 |
| CN | 1290850 | 4/2001 |
| CN | 1290850 A | 4/2001 |
| CN | 1362692 | 8/2002 |
| CN | 1362692 A | 8/2002 |
| CN | 1474159 A | 2/2004 |
| CN | 1531659 A | 9/2004 |
| CN | 1608212 A | 4/2005 |
| CN | 1926400 A | 3/2007 |
| CN | 101031817 A | 9/2007 |
| CN | 101203730 A | 6/2008 |
| CN | 101297176 A | 10/2008 |
| CN | 101371160 A | 2/2009 |
| CN | 101427155 A | 5/2009 |
| CN | 101750012 A | 6/2010 |
| CN | 101776982 A | 7/2010 |
| CN | 201548192 U | 8/2010 |
| DE | 7704949 U1 | 6/1977 |
| DE | 3530922 A1 | 8/1984 |
| DE | 3827458 A1 | 2/1990 |
| DE | 10022054 A1 | 11/2001 |
| DE | 10160090 A1 | 7/2002 |
| DE | 202004004945 U1 | 10/2004 |
| DE | 102004024171 A1 | 9/2005 |
| DE | 102005019058 A1 | 12/2005 |
| DE | 102006013185 A1 | 9/2007 |
| DE | 202006020299 U1 | 5/2008 |
| DE | 60319016 | 4/2009 |
| DE | 102007058692 A1 | 6/2009 |
| DE | 102009040837 A1 | 3/2011 |
| EP | 0166106 | 1/1986 |
| EP | 0598523 A1 | 5/1994 |
| EP | 598523 A1 | 5/1994 |
| EP | 0797076 A2 | 9/1997 |
| EP | 0919831 A2 | 6/1999 |
| EP | 0957336 A2 | 11/1999 |
| EP | 1067363 A2 | 1/2001 |
| EP | 1607767 A1 | 12/2005 |
| EP | 2177868 A2 | 10/2009 |
| EP | 2219011 A1 | 8/2010 |
| EP | 2259010 A1 | 12/2010 |
| EP | 2259013 A1 | 12/2010 |
| EP | 2322901 A2 | 5/2011 |
| EP | 2446300 A1 | 5/2012 |
| GB | 1543636 | 4/1979 |
| GB | 2503179 A | 12/2013 |
| GB | 2503390 A | 12/2013 |
| GB | 2516528 A | 1/2015 |
| GB | 2518544 A | 3/2015 |
| GB | 2518769 A | 4/2015 |
| GB | 2518998 A | 4/2015 |
| JP | 57147800 | 9/1982 |
| JP | 5804881 | 3/1983 |
| JP | S5848881 A | 3/1983 |
| JP | 2184788 | 7/1990 |
| JP | 2184788 A1 | 7/1990 |
| JP | H0331715 A | 2/1991 |
| JP | H0371116 A | 3/1991 |
| JP | H0465631 A | 3/1992 |
| JP | H05257005 | 10/1993 |
| JP | H05302976 A | 11/1993 |
| JP | 6097288 | 4/1994 |
| JP | H06214186 | 8/1994 |
| JP | H06229715 A | 8/1994 |
| JP | H0665818 | 9/1994 |
| JP | H06265355 A | 9/1994 |
| JP | H074967 A | 1/1995 |
| JP | H08145679 A | 6/1996 |
| JP | H0914965 A | 1/1997 |
| JP | H09113223 | 5/1997 |
| JP | H102722 | 1/1998 |
| JP | H10107357 A | 4/1998 |
| JP | H10317874 A | 12/1998 |
| JP | 11502629 A | 3/1999 |
| JP | H11304465 A | 11/1999 |
| JP | 11337642 | 12/1999 |
| JP | 2000503476 A | 3/2000 |
| JP | 2000275042 | 10/2000 |
| JP | 2000346645 A | 12/2000 |
| JP | 2001013247 A | 1/2001 |
| JP | 2001165662 A | 6/2001 |
| JP | 2001513204 A | 8/2001 |
| JP | 2001272468 | 10/2001 |
| JP | 2001284317 A | 10/2001 |
| JP | 2001353112 A | 12/2001 |
| JP | 2002089184 A | 3/2002 |
| JP | 2002098762 | 4/2002 |
| JP | 2002098762 A | 4/2002 |
| JP | 2002139310 A | 5/2002 |
| JP | 2002209361 A | 7/2002 |
| JP | 2003506691 A | 2/2003 |
| JP | 2004508954 A | 3/2004 |
| JP | 2004527751 | 9/2004 |
| JP | 2005010585 | 1/2005 |
| JP | 3109969 | 4/2005 |
| JP | 2005265700 A | 9/2005 |
| JP | 2006003127 A | 1/2006 |
| JP | 2006058091 A | 3/2006 |
| JP | 2006084460 A | 3/2006 |
| JP | 2006220514 A | 8/2006 |
| JP | 2006276012 A | 10/2006 |
| JP | 2006526844 A | 11/2006 |
| JP | 2007504459 A | 3/2007 |
| JP | 2007165331 A | 6/2007 |
| JP | 2007523357 A | 8/2007 |
| JP | 2007256872 A | 10/2007 |
| JP | 2008027308 A | 2/2008 |
| JP | 2004108939 | 4/2008 |
| JP | 2008514967 | 5/2008 |
| JP | 2008544215 A | 12/2008 |
| JP | 2009014639 A | 1/2009 |
| JP | 2009134761 A | 6/2009 |
| JP | 2009229350 A | 10/2009 |
| JP | 2010169633 A | 8/2010 |
| JP | 2011158371 A | 8/2011 |
| JP | 2011526706 A | 10/2011 |
| JP | 2013525787 A | 10/2011 |
| JP | H04504468 A | 10/2011 |
| JP | 2012509464 A | 4/2012 |
| JP | 2012530909 A | 12/2012 |
| JP | 5302976 B2 | 10/2013 |
| TW | 381361 B | 2/2000 |
| WO | 9012284 | 10/1990 |
| WO | 9534849 A1 | 12/1995 |
| WO | 0109642 A1 | 2/2001 |
| WO | 0177613 A1 | 10/2001 |
| WO | 0223121 A1 | 3/2002 |
| WO | 0237466 A1 | 5/2002 |
| WO | 02084327 A2 | 10/2002 |
| WO | 03062744 A1 | 7/2003 |
| WO | 03073121 A1 | 9/2003 |
| WO | 2004063668 | 7/2004 |
| WO | 2005026772 A2 | 3/2005 |
| WO | 2006039682 A1 | 4/2006 |
| WO | 2006052259 A1 | 5/2006 |
| WO | 2006055770 A2 | 5/2006 |
| WO | 2007079601 A1 | 7/2007 |
| WO | 2007084209 A2 | 7/2007 |

(56) References Cited

FOREIGN PATENT DOCUMENTS

| WO | 2007123604 A1 | 11/2007 |
|---|---|---|
| WO | 2007124010 A2 | 11/2007 |
| WO | 2008052348 A1 | 5/2008 |
| WO | 2008119073 A2 | 10/2008 |
| WO | 2008121919 A1 | 10/2008 |
| WO | 2010057169 A2 | 5/2010 |
| WO | 2010100043 A1 | 9/2010 |
| WO | 2010107434 A1 | 9/2010 |
| WO | 2010141120 A2 | 12/2010 |
| WO | 2010148525 A1 | 12/2010 |
| WO | 2010148526 A1 | 12/2010 |
| WO | 2011035290 | 3/2011 |
| WO | 2011057130 A2 | 5/2011 |
| WO | 2011107729 A1 | 9/2011 |
| WO | 2011112277 A1 | 9/2011 |
| WO | 2012142074 A2 | 10/2012 |
| WO | 2014143644 A1 | 9/2014 |
| WO | 2014149701 A1 | 9/2014 |
| WO | 2014149702 A1 | 9/2014 |
| WO | 2014149704 A1 | 9/2014 |
| WO | 2014149705 A1 | 9/2014 |
| WO | 2014149706 A1 | 9/2014 |

OTHER PUBLICATIONS

"Fiber Optic Rotary Joints Product Guide"; Moog Inc; MS1071, rev. 2; p. 1-4; 2010; Retrieved on Nov. 13, 2013 from http://www.moog.com/literature/ICD/Moog-Fiber-Optic-Rotary-Joint_Catalog-en.pdf.

"Technical Brief: Fiber Optic Rotary Joint"; Document No. 303; Moog Inc; p. 1-6; 2008; Retrieved on Nov. 13, 2013 from http://www.moog.com/literature/MCG/FORJtechbrief.pdf.

Automated Precision, Inc., Product Specifications, Radian, Featuring INNOVO Technology, info@apisensor.com, Copyright 2011, 2 pages.

Integrated Optical Amplitude Modulator; [on-line technical data sheet]; [Retrieved Jan. 16, 2015]; Jenoptik; Retrieved from http://www.jenoptik.com/cms/products.nsf/0/A6DF20B50AEE7819C12576FE0074E8E6/$File/amplitudemodulators_en.pdf?Open.

Katowski "Optical 3-D Measurement Techniques—Applications in inspection, quality control and robotic" Vienna, Austria, Sep. 18-20, 1989.

Leica Absolute Tracker AT401 Powerlock, Dec. 18, 2014.

Rahman, et al., "Spatial-Geometric Approach to Physical Mobile Interaction Based on Accelerometer and IR Sensory Data Fusion", ACM Transactions on Multimedia Computing, Communications and Applications, vol. 6, No. 4, Article 28, Publication date: Nov. 2010, 23 pages.

"DLP-Based Structured Light 3D Imaging Technologies and Applications" by J. Geng; Proceedings of SPIE, vol. 7932. Published Feb. 11, 2011, 15 pages.

Rahman, et al., "Spatial-Geometric Approach to Physical Mobile Interaction Based on Accelerometer and IR Sensory Data Fusion", ACM Transactions on Multimedia Computing, Communications and Applications, vol. 6, No. 4, Article 28, Publication date: Nov. 2010.

Stone, et al. "Automated Part Tracking on the Construction Job Site" 8 pp; XP 55055816A; National Institute of Standards and Technology.

Parker, et al "Instrument for Setting Radio Telescope Surfaces" (4 pp) XP 55055817A.

International Search Report mailed Mar. 19, 2013 for International Application Serial No. PCT/US2013/022515; International filing date Jan. 22, 2013.

Cuypers, et al "Optical Measurement Techniques for Mobile and Large-Scale Dimensional Metrology" (2009) ; Optics and Lasers in Engineering pp. 292-300; vol. 47; Elsevier Ltd. XP 25914917A.

Written Opinion of the International Searching Authority mailed Mar. 19, 2013 for International Application Serial No. PCT/US2013/022515; International filing date Jan. 22, 2013.

Chen Jihua et al, Research on the Principle of 5/6-DOF Laser Tracking Metrology, Journal of Astronautic Metrology and Measurement vol. 27, No. 3, May 31, 2007, pp. 58-62 , (Machine Translation Attached).

James H. Burge et al, Use of a commerical laser tracker for optical alignment, Proc, of SPIE vol. 6676, Sep. 21, 2007, pp. 66760E-1-6 6760E-12.

Hanwei Xiong et al: "The Development of Optical Fringe Measurement System integrated with a CMM for Products Inspection." Proceedings of SPIE, vol. 7855, Nov. 3, 2010, pp. 78551W-7855W-8, XP055118356. ISSN: 0277-786X.

Jsladek et al: "The Hybrid Contact-Optical Coordinate Measuring System." Measurement, vol. 44, No. 3, Mar. 1, 2011, pp. 503-510, XPO55047404, ISSN: 0263-2241.

Burge, James H., et al, Use of a commerical laser tracker for optical alignment, Proc, of SPIE vol. 6676, Sep. 21, 2007, pp. 66760E-1-6 6760E-12.

Chen, Jihua, et al, Research on the Principle of 5/6-DOF Laser Tracking Metrology, Journal of Astronautic Metrology and Measurement vol. 27, No. 3, May 31, 2007, pp. 58-62.

International Search report of the International Application No. PCT/US2013/022515 mailed Aug. 7, 2014.

Leica Geosystems AG ED—"Leica Laser Tracker System", Internet Citation, Jun. 28, 2012 (Jun. 28, 2012), XP002678836, Retrieved from the Internet: URL:http://www.a-solution.com.au/pages/downloads/LTD500_Brochure_EN.pdf.

Leica Geosystems Metrology, "Leica Absolute Tracker AT401, White Paper," Hexagon AB; 2010.

Leica Geosystems: "TPS1100 Professional Series", 1999, Retrieved from the Internet: URL:http://www.estig.ipbeja.pt/~legvm/top_civil/TPS1100%20-%20A%20New%20Generation%20of%20Total%20Stations.pdf, [Retrieved on Jul. 2012] the whole document.

Li, et al., "Real Time Hand Gesture Recognition using a Range Camera", Australasian Conference on Robotics and Automation (ACRA), [Retrieved Aug. 10, 2011, http://www.araa.asn.au/acra/acra2009/papers/pap128s1.pdf] pp. 1-7 (2009).

Lightvision—High Speed Variable Optical Attenuators (VOA); [on-line]; A publication of Lightwaves 2020, Feb. 1, 2008; Retreived from http://www.lightwaves2020.com/home/.

Maekynen, A. J. et al., Tracking Laser Radar for 3-D Shape Measurements of Large Industrial Objects Based on Time-of-Flight Laser Rangefinding and Position-Sensitive Detection Techniques, IEEE Transactions on Instrumentation and Measurement, vol. 43, No.

Making the Big Step from Electronics to Photonics by Modulating a Beam of Light with Electricity; May 18, 2005; [on-line]; [Retrieved May 7, 2009]; Cornell University News Service; Retrieved from http://www.news.cornell.edu/stories/May05/LipsonElectroOptica.

Matsumaru, K., "Mobile Robot with Preliminary-Announcement and Display Function of Forthcoming Motion Using Projection Equipment," Robot and Human Interactive Communication, 2006. RO-MAN06. The 15th IEEE International Symposium, pp. 443-450, Sep. 6-8.

MEMS Variable Optical Attenuators Single/Multi-Channel; [on-line]; Jan. 17, 2005; Retreived from www.ozoptics.com.

Nanona High Speed & Low Loss Optical Swtich; [on-line technical data sheet]; [Retreived Oct. 14, 2010]; Retreived from http://www.bostonati.com/products/PI-FOS.pdf.

New River Kinematics, SA Arm—The Ultimate Measurement Software for Arms, Software Release! SA Sep. 30, 2010, [On-line], http://www.kinematics.com/news/software-release-sa20100930.html (1 of 14), [Retrieved Apr. 13, 2011 11:40:47 AM].

Optical Circulator (3-Ports & 4-Ports); [on-line technical data sheet]; Alliance Fiber Optic Products, Inc. REV.D Jan. 15, 2004; Retrieved from www.afop.com.

Optical Circulators Improve Bidirectional Fiber Systems; By Jay S. Van Delden; [online]; [Retrieved May 18, 2009]; Laser Focus

(56) References Cited

OTHER PUBLICATIONS

World; Retrieved from http://www.laserfocusworld.com/display_article/28411/12/nonc/nonc/News/Optical-circulators-improve-bidirecti.
Ou-Yang, Mang, et al., "High-Dynamic-Range Laser Range Finders Based on a Novel Multimodulated Frequency Method", Optical Engineering, vol. 45, No. 12, Jan. 1, 2006, p. 123603, XP55031001, ISSN: 0091-3286, DOI: 10.1117/1.2402517, the whole document.
PCMM System Specifications Leica Absolute Tracker and Leica T-Products; Hexagon Metrology; Leica Geosystems Metrology Products, Switzerland; 8 pages; www.leica-geosystems.com/metrology.
Poujouly, Stephane, et al., "A Twofold Modulation Frequency Laser Range Finder; A Twofold Modulation Frequency Laser Range Finder", Journal of Optics. A, Pure and Applied Optics, Institute of Physics Publishing, Bristol, GB, vol. 4, No. 6, Nov. 1, 2.
Poujouly, Stephane, et al., Digital Laser Range Finder: Phase-Shift Estimation by Undersampling Technique; IEEE, Copyright 1999.
RS Series Remote Controlled Optical Switch; [on-line technical data sheet]; Sercalo Microtechnology, Ltd. [Retreived Oct. 14, 2010]; Retreived from http://www.sercalo.com/document/PDFs/DataSheets/RS%20datasheet.pdf.
Super-Nyquist Operation of the AD9912 Yields a High RF Output Signal; Analog Devices, Inc., AN-939 Application Note; www.analog.com; Copyright 2007.
Turk, et al., "Perceptual Interfaces", UCSB Technical Report 2003-33, pp. 1-43 [Retreived Aug. 11, 2011, http://www.cs.ucsb.edu/research/tech_reports/reports/2003-33.pdf] (2003).
2×2 High Speed Lithium Niobate Interferometric Switch; [on-line]; JDS Uniphase Corporation; 2007; Retreived from www.jdsu.com.
AO Modulator—M040-8J-FxS; [online—technical data sheet]; Gooch & Housego; Nov. 2006; Retreived from http://www.goochandhousego.com/.
Cao, et al."VisionWand: Interaction Techniques for Large Displays using a Passive Wand Tracked in 3D", Proceedings of the 16th Annual ACM Symposium on User Interface Software and Technology, UIST, vol. 5, Issue 2, pp. 173-182, (Jan. 2003).

Chen, Junewen, "Novel Laser Range Finding Algorithms", Proceedings of SPIE, vol. 6100, Jan. 1, 2006, pp. 61001Q-61001Q-8, XP55031002, ISSN: 0277-786X, DOI: 10.1117/12.645131, the whole document.
EOSpace—High-Speed Switches; [on-line technical brochure]; [Retrieved May 18, 2009]; Retrieved from http://www.cospace.com/Switches.htm.
FARO Laser Tracker ION; 2 pages; revised Apr. 23, 2010; FARO Technologies, Inc., www.lasertracker.faro.com.
Hecht, Jeff, Photonic Frontiers: Gesture Recognition: Lasers Bring Gesture Recognition to the Home, Laser Focus World, pp. 1-5, [Retrieved On-Line Mar. 3, 2011], http://www.optoiq.com/optoiq-2/en-us/index/photonics-technologies-applications/lfw-display/lfw.
Hui E et al: "Single-Step Assembly of Complex 3-D microstructures." Jan. 23, 2000, pp. 602-607, XP010377196.
Kester, Walt, Practical Analog Design Techniques, Analog Devices, Section 5, Undersampling Applications, Copyright 1995, pp. 5-1 to 5-34.
Kollorz, et al., "Gesture recognition with a time-of-flight camera", International Journal of Intelligent Systems Technologies and Applications, vol. 5, No. 3/4, pp. 334-343, [Retreived Aug. 11, 2011; http://www5.informatik.uni-erlangen.de/Forschung/Publikat.
LaserTRACER—measureing sub-micron in space; http://www.etalon-ag.com/index.php/en/products/lasertracer; 4 pages; Jun. 28, 2011; ETALON AG.
Leica Absolute Tracker AT401-ASME B89.4.19-2006 Specifications; Hexagon Metrology; Leica Geosystems Metrology Products, Switzerland; 2 pages; www.leica-geosystems.com/metrology.
Newport Company "Fiber Optic Scribes" https://web.archive.org/web/20120903063012/http://www.newport.com/Fiber-Optic-Scribes/835171/1033/info.aspx; 2012, 2 pages.
Newport Corporation "Projects in Fiber Optics: Applications Handbook", 1986; 3 pages.
Takeuchi et al., "Ultraprecision 3D Micromachining of Glass"; Annals of the CIRP; Jan. 4, 1996; vol. 45; 401-404 pages.
Thorlabs "Ruby Dualscribe Fiber Optic Scribe" a Mechanical Drawing, 2014, 1 page.

* cited by examiner

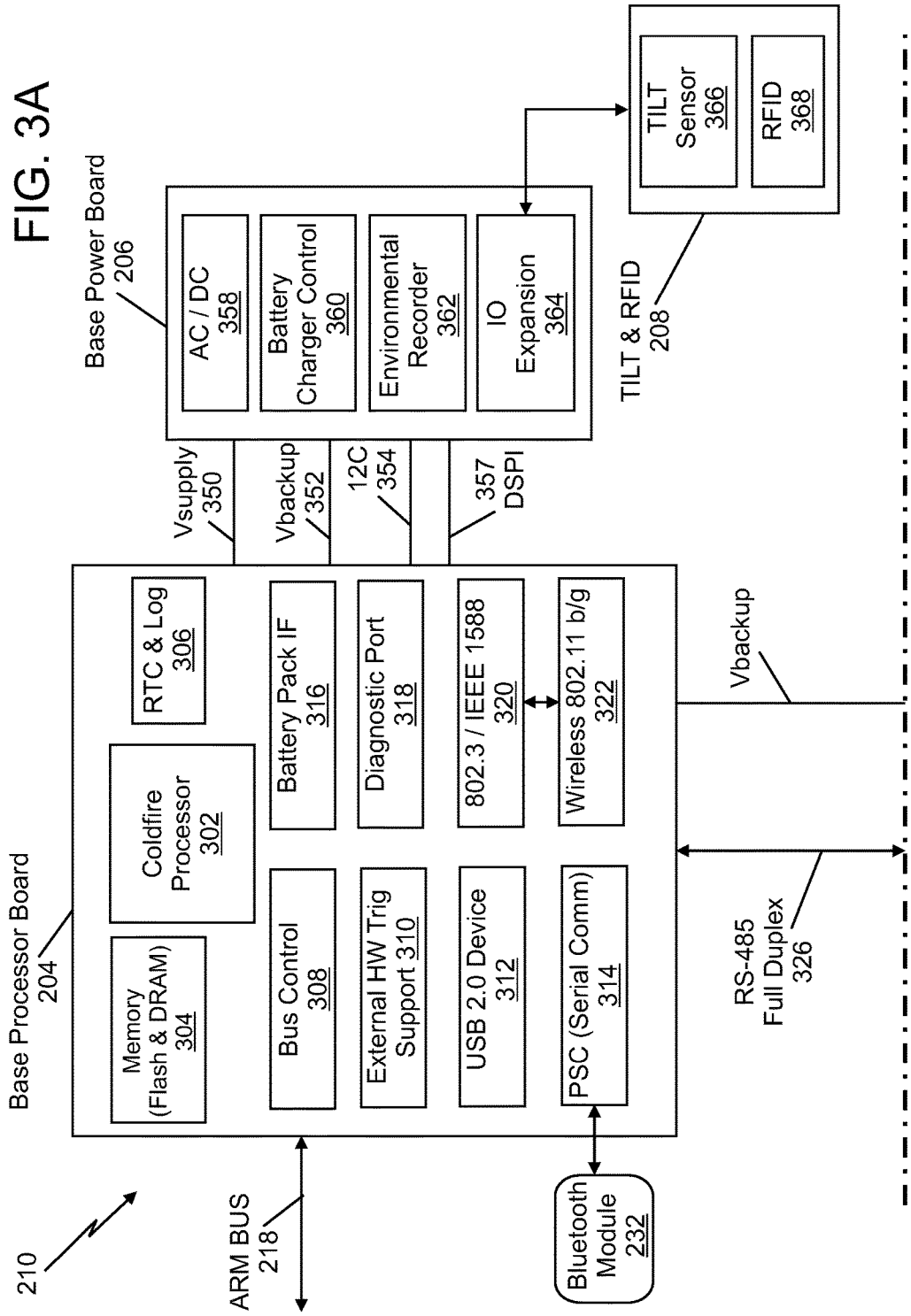

MEASUREMENT MACHINE UTILIZING A BARCODE TO IDENTIFY AN INSPECTION PLAN FOR AN OBJECT

CROSS REFERENCE TO RELATED APPLICATIONS

The present application claims priority to U.S. Provisional Application Ser. No. 61/591,290 filed on Jan. 27, 2012, the contents of which are incorporated by reference herein.

BACKGROUND

The present disclosure relates to a measurement machine for measuring an object, and more particularly to a measurement machine such as a portable articulated arm coordinate measuring machine or a laser tracker that measures an object according to a measurement or inspection plan that is identified by a bar code located on the object to be measured or on a drawing (e.g., a CAD drawing) of the object.

Portable articulated arm coordinate measuring machines (AACMMs) have found widespread use in the manufacturing or production of parts or objects where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art portable articulated arm CMM is disclosed in commonly assigned U.S. Pat. No. 5,402,582 ('582), which is incorporated herein by reference in its entirety. The '582 patent discloses a 3-D measuring system comprised of a manually-operated articulated arm CMM having a support base on one end and a measurement probe at the other end. Commonly assigned U.S. Pat. No. 5,611,147 ('147), which is incorporated herein by reference in its entirety, discloses a similar articulated arm CMM. In the '147 patent, the articulated arm CMM includes a number of features including an additional rotational axis at the probe end, thereby providing for an arm with either a two-two-two or a two-two-three axis configuration (the latter case being a seven axis arm).

Another common type of measurement machine for measuring a part or object to determine whether or not that manufactured part or object conforms to the desired design specifications is a laser tracker. A laser tracker measures the 3-D coordinates of a certain point by sending a laser beam to the point, where the laser beam is typically intercepted by a retroreflector target. The laser tracker finds the coordinates of the point by measuring the distance and the two angles to the target. The distance is measured with a distance-measuring device such as an absolute distance meter (ADM) or an interferometer. The angles are measured with an angle-measuring device such as an angular encoder. A gimbaled beam-steering mechanism within the instrument directs the laser beam to the point of interest. The retroreflector may be moved manually by hand, or automatically, over the surface of the object. The laser tracker follows the movement of the retroreflector to measure the coordinates of the object. Exemplary laser trackers are disclosed in U.S. Pat. No. 4,790,651 to Brown et al., incorporated by reference herein; and U.S. Pat. No. 4,714,339 to Lau et al. The total station, which is most often used in surveying applications, may be used to measure the coordinates of diffusely scattering or retroreflective targets. The total station is closely related to the laser tracker.

A common type of retroreflector target is the spherically mounted retroreflector (SMR), which comprises a cube-corner retroreflector embedded within a metal sphere. The cube-corner retroreflector comprises three mutually perpendicular mirrors. The apex of the cube corner, which is the common point of intersection of the three mirrors, is located at the center of the sphere. It is common practice to place the spherical surface of the SMR in contact with an object under test and then move the SMR over the surface of the object being measured. Because of this placement of the cube corner within the sphere, the perpendicular distance from the apex of the cube corner to the surface of the object under test remains constant despite rotation of the SMR. Consequently, the 3-D coordinates of the object's surface can be found by having a tracker follow the 3-D coordinates of an SMR moved over the surface. It is possible to place a glass window on the top of the SMR to prevent dust or dirt from contaminating the glass surfaces. An example of such a glass surface is shown in U.S. Pat. No. 7,388,654 to Raab et al., incorporated by reference herein.

A gimbal mechanism within the laser tracker may be used to direct a laser beam from the tracker to the SMR. Part of the light retroreflected by the SMR enters the laser tracker and passes onto a position detector. The position of the light that hits the position detector is used by a tracker control system to adjust the rotation angles of the mechanical azimuth and zenith axes of the laser tracker to keep the laser beam centered on the SMR. In this way, the tracker is able to follow (track) the SMR as it is moved.

Angular encoders attached to the mechanical azimuth and zenith axes of the tracker may measure the azimuth and zenith angles of the laser beam (with respect to the tracker frame of reference). The one distance measurement and two angle measurements performed by the laser tracker are sufficient to completely specify the three-dimensional location of the SMR.

As mentioned, two types of distance meters may be found in laser trackers: interferometers and absolute distance meters (ADMs). In the laser tracker, an interferometer (if present) may determine the distance from a starting point to a finishing point by counting the number of increments of known length (usually the half-wavelength of the laser light) that pass as a retroreflector target is moved between the two points. If the beam is broken during the measurement, the number of counts cannot be accurately known, causing the distance information to be lost. By comparison, the ADM in a laser tracker determines the absolute distance to a retroreflector target without regard to beam breaks, which also allows switching between targets. Because of this, the ADM is said to be capable of "point-and-shoot" measurement. Initially, absolute distance meters were only able to measure stationary targets and for this reason were always used together with an interferometer. However, some modern absolute distance meters can make rapid measurements, thereby eliminating the need for an interferometer. Such an ADM is described in U.S. Pat. No. 7,352,446 to Bridges et al., incorporated by reference herein. The distances measured by interferometers and absolute distance meters are dependent on the speed of light through air. Since the speed of light varies with air temperature, barometric pressure, and air humidity, it is common practice to measure these quantities with sensors and to correct the speed of light in air to obtain more accurate distance readings. The distances measured by total stations also depend on the speed of light in air.

In its tracking mode, the laser tracker automatically follows movements of the SMR when the SMR is in the capture range of the tracker. If the laser beam is broken, tracking will stop. The beam may be broken by any of several means: (1) an obstruction between the instrument and SMR; (2) rapid movements of the SMR that are too fast for the instrument to follow; or (3) the direction of the SMR being turned beyond the acceptance angle of the SMR. By default, following the beam break, the beam may remain fixed at the point of the beam break, at the last commanded position, or may go to a reference ("home") position. It may be necessary for an operator to visually search for the tracking beam and place the SMR in the beam in order to lock the instrument onto the SMR and continue tracking.

Some laser trackers include one or more cameras. A camera axis may be coaxial with the measurement beam or offset from the measurement beam by a fixed distance or angle. A camera may be used to provide a wide field of view to locate retroreflectors. A modulated light source placed near the camera optical axis may illuminate retroreflectors, thereby making them easier to identify. In this case, the retroreflectors flash in phase with the illumination, whereas background objects do not. One application for such a camera is to detect multiple retroreflectors in the field of view and measure each retroreflector in an automated sequence. Exemplary systems are described in U.S. Pat. No. 6,166,809 to Pettersen et al., and U.S. Pat. No. 7,800,758 to Bridges et al., incorporated by reference herein.

Some laser trackers have the ability to measure with six degrees of freedom (DOF), which may include three coordinates, such as x, y, and z, and three rotations, such as pitch, roll, and yaw. Several systems based on laser trackers are available or have been proposed for measuring six degrees of freedom. Exemplary systems are described in U.S. Pat. No. 7,800,758 to Bridges et al., U.S. Pat. No. 5,973,788 to Pettersen et al., and U.S. Pat. No. 7,230,689 to Lau.

While existing measurement machines such as portable AACMMs or laser trackers are suitable for their intended purposes, there remains a need for a simplified method of inspecting parts based on machine readable information provided on the parts or on representation of the parts.

SUMMARY OF THE INVENTION

In accordance with an embodiment of the invention, a method for inspecting a part according to an inspection plan is provided. The method uses a portable articulated arm coordinate measuring machine (AACMM) having a base; a manually positionable arm portion having opposed first and second ends, the second end of the arm portion being coupled to the base, the arm portion including a plurality of connected arm segments, each arm segment including at least one position transducer for producing a position signal; a measurement device coupled to the first end of the arm portion; and an electronic circuit which receives the position signal from the at least one position transducer and provides data corresponding to a position of the measurement device. The method includes the steps of generating an inspection plan for a part to be inspected to determine at least one characteristic of the part. A machine readable information symbol is generated that includes information that identifies the generated inspection plan. The generated machine readable information symbol is associated with the part. The machine readable information symbol from the part is read with a reader device configured to translate the machine readable information symbol to determine the information contained therein, the reader device being coupled to communicate with the AACMM. The at least one part characteristic is measured according to the generated inspection plan identified by the machine readable symbol.

According to another embodiment of the invention, another method for inspecting a part according to an inspection plan is provided. The method uses a laser tracker having a light source that emits a light beam towards a target located within an environment, and a reader device that captures the light beam reflected back to the laser scanner from the target located within the environment. The method includes the steps of generating an inspection plan for a part to be inspected to determine at least one characteristic of the part. A machine readable information symbol is generated that identifies the generated inspection plan. The generated machine readable information symbol is associated with the part. The machine readable information symbol is read with the reader device associated with the laser tracker. The part is inspected according to the generated inspection plan identified by machine readable information symbol read by the reader device.

According to another embodiment of the invention, a system for inspecting a part according to an inspection plan is provided. The system includes a measurement machine configured to measure at least one characteristic of the part. A device having a processor is provided. The processor being responsive to executable computer instructions when executed on the processor for generating an inspection plan for a part to be inspected to determine at least one characteristic of the part, the processor further being responsive to generating a machine readable information symbol that includes information that identifies the generated inspection plan in response to the inspection plan being generated. A reader is coupled to communicate with the measurement machine and the device, the reader being configured to translate the machine readable information symbol to determine the information contained therein.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 1, including

FIG. 9, including

FIG. 13, including

DETAILED DESCRIPTION

Portable articulated arm coordinate measuring machines ("AACMM") and laser trackers are used in a variety of applications to obtain measurements of parts or objects, for example, to determine how accurately the part or object was made to the desired design specifications. Embodiments of the present invention provide advantages in allowing a user of the portable AACMM or laser tracker to access an inspection or measurement plan for a manufactured part or object with relative ease and quickness through use of a machine readable identification system, such as a bar code for example, associated with a corresponding inspection or measurement plan associated with that part or object. In the exemplary embodiment, each bar code is associated with a single part or a group of parts.

Figure 1A:
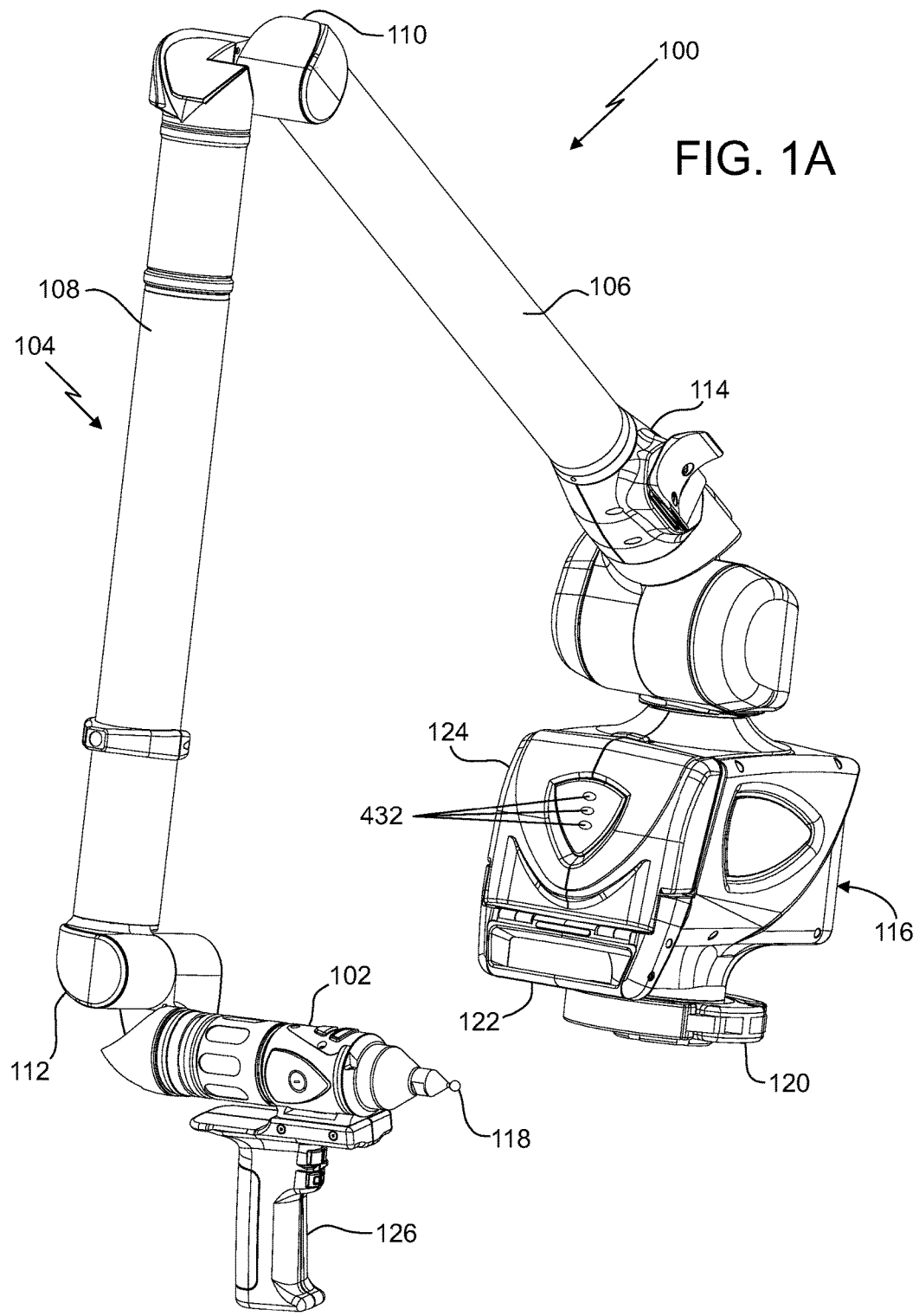
FIGS. 1A and 1B, are perspective views of a portable articulated arm coordinate measuring machine (AACMM) having embodiments of various aspects of the present invention therewithin.
Figure 1B:
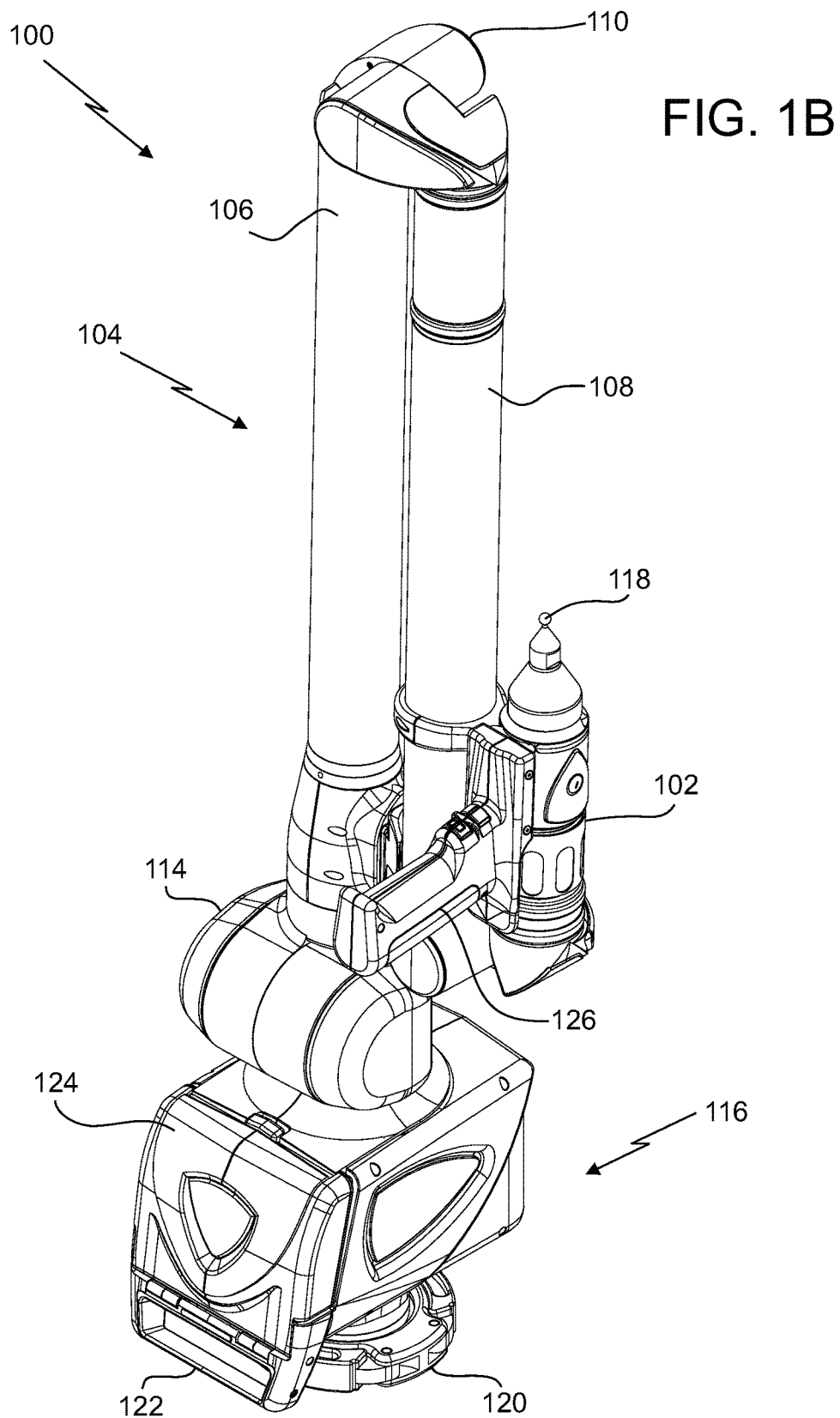

FIGS. 1A and 1B illustrate, in perspective, an AACMM 100 according to various embodiments of the present invention, an articulated arm being one type of coordinate measuring machine. As shown in FIGS. 1A and 1B, the exemplary AACMM 100 may comprise a six or seven axis articulated measurement device having a probe end that includes a measurement probe housing 102 coupled to an arm portion 104 of the AACMM 100 at one end. The arm portion 104 comprises a first arm segment 106 coupled to a second arm segment 108 by a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the probe end may include a measurement probe housing 102 that comprises the shaft of the seventh axis portion of the AACMM 100 (e.g., a cartridge containing an encoder system that determines movement of the measurement device, for example a probe 118, in the seventh axis of the AACMM 100). In this embodiment, the probe end may rotate about an axis extending through the center of measurement probe housing 102. In use of the AACMM 100, the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

The probe 118 is detachably mounted to the measurement probe housing 102, which is connected to bearing cartridge grouping 112. A handle 126 is removable with respect to the measurement probe housing 102 by way of, for example, a quick-connect interface. The handle 126 may be replaced with another device (e.g., a laser line probe, a bar code reader), thereby providing advantages in allowing the operator to use different measurement devices with the same AACMM 100. In various embodiments of the present invention, the bar code reader is used in place of the handle 126, or is mounted elsewhere on the portable AACMM, and is utilized to read or scan in machine-readable symbols (e.g.

bar codes) that are indicative of measurement or inspection plans for a particular part or object to be measured by the portable AACMM. These various embodiments that utilize a bar code reader are described in detail herein after.

In exemplary embodiments, the probe housing 102 houses a removable probe 118, which is a contacting measurement device and may have different tips 118 that physically contact the object to be measured, including, but not limited to: ball, touch-sensitive, curved and extension type probes. In other embodiments, the measurement is performed, for example, by a non-contacting device such as a laser line probe (LLP). In an embodiment, the handle 126 is replaced with the LLP using the quick-connect interface. Other types of measurement devices may replace the removable handle 126 to provide additional functionality. Examples of such measurement devices include, but are not limited to, one or more illumination lights, a temperature sensor, a thermal scanner, a bar code reader or scanner, a projector, a paint sprayer, a camera, or the like, for example.

As shown in FIGS. 1A and 1B, the AACMM 100 includes the removable handle 126 that provides advantages in allowing accessories or functionality to be changed without removing the measurement probe housing 102 from the bearing cartridge grouping 112. As discussed in more detail below with respect to FIG. 2, the removable handle 126 may also include an electrical connector that allows electrical power and data to be exchanged with the handle 126 and the corresponding electronics located in the probe end.

In various embodiments, each grouping of bearing cartridges 110, 112, 114 allows the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail herein below. Each individual raw encoder count is sent separately to the electronic data processing system as a signal where it is further processed into measurement data. No position calculator separate from the AACMM 100 itself (e.g., a serial box) is used, as disclosed in commonly assigned U.S. Pat. No. 5,402,582 ('582).

The base 116 may include an attachment device or mounting device 120. The mounting device 120 allows the AACMM 100 to be removably mounted to a desired location, such as an inspection table, a machining center, a wall or the floor for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen 428, as described in more detail herein after with respect to FIG. 4.

In accordance with an embodiment, the base 116 of the portable AACMM 100 contains or houses an electronic data processing system that includes two primary components: a base processing system that processes the data from the various encoder systems within the AACMM 100 as well as data representing other arm parameters to support three-dimensional (3-D) positional calculations; and a user interface processing system that includes an on-board operating system, a touch screen display, and resident application software that allows for relatively complete metrology functions to be implemented within the AACMM 100 without the need for connection to an external computer.

The electronic data processing system in the base 116 may communicate with the encoder systems, sensors, and other peripheral hardware located away from the base 116 (e.g., a LLP that can be mounted to the removable handle 126 on the AACMM 100). The electronics that support these peripheral hardware devices or features may be located in each of the bearing cartridge groupings 110, 112, 114 located within the portable AACMM 100.

Figure 2A:
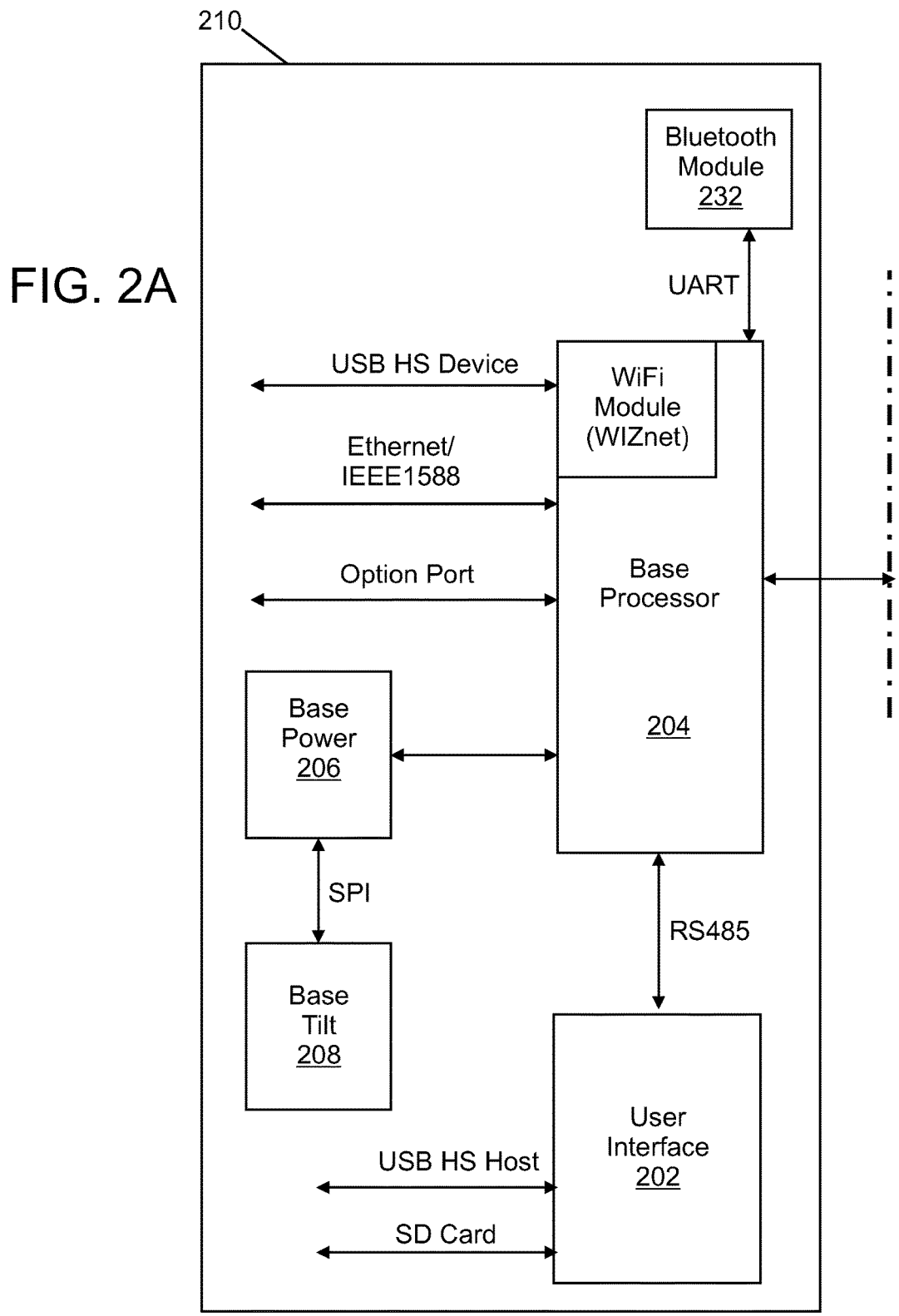
FIG. 2, including FIGS. 2A-2D taken together, is a block diagram of electronics utilized as part of the AACMM of FIG. 1 in accordance with an embodiment.
Figure 2B:
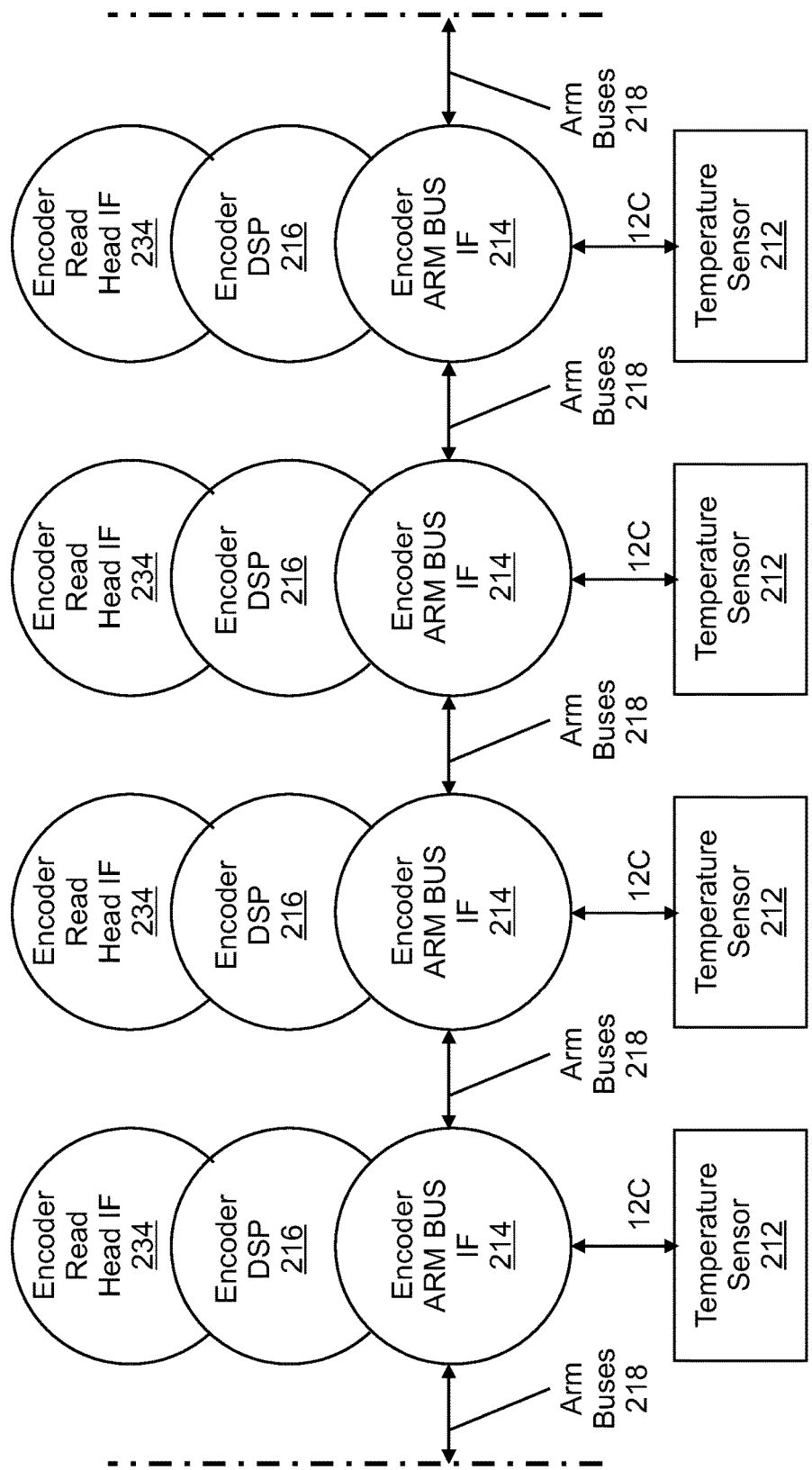
Figure 2C:
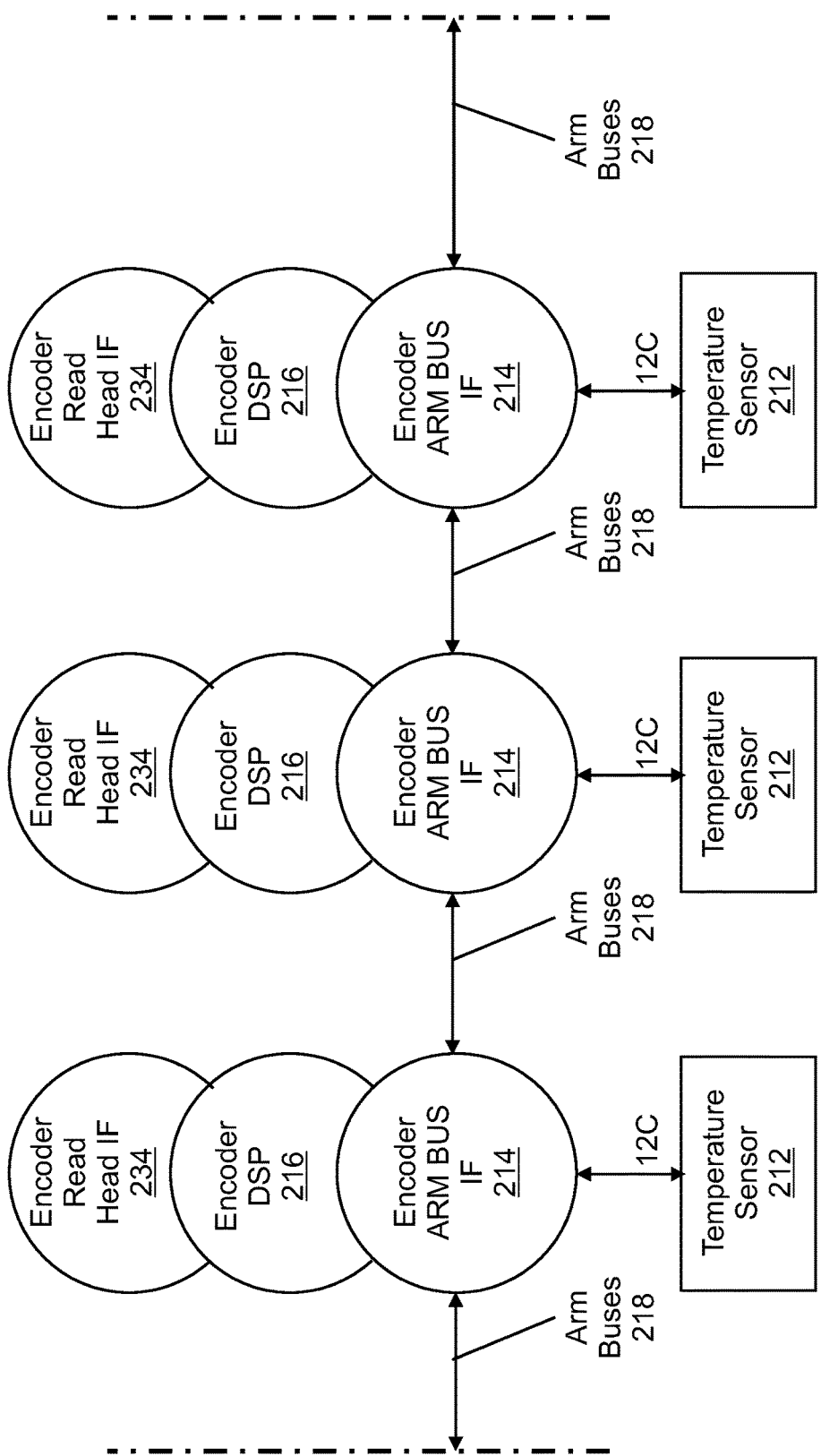
Figure 2D:
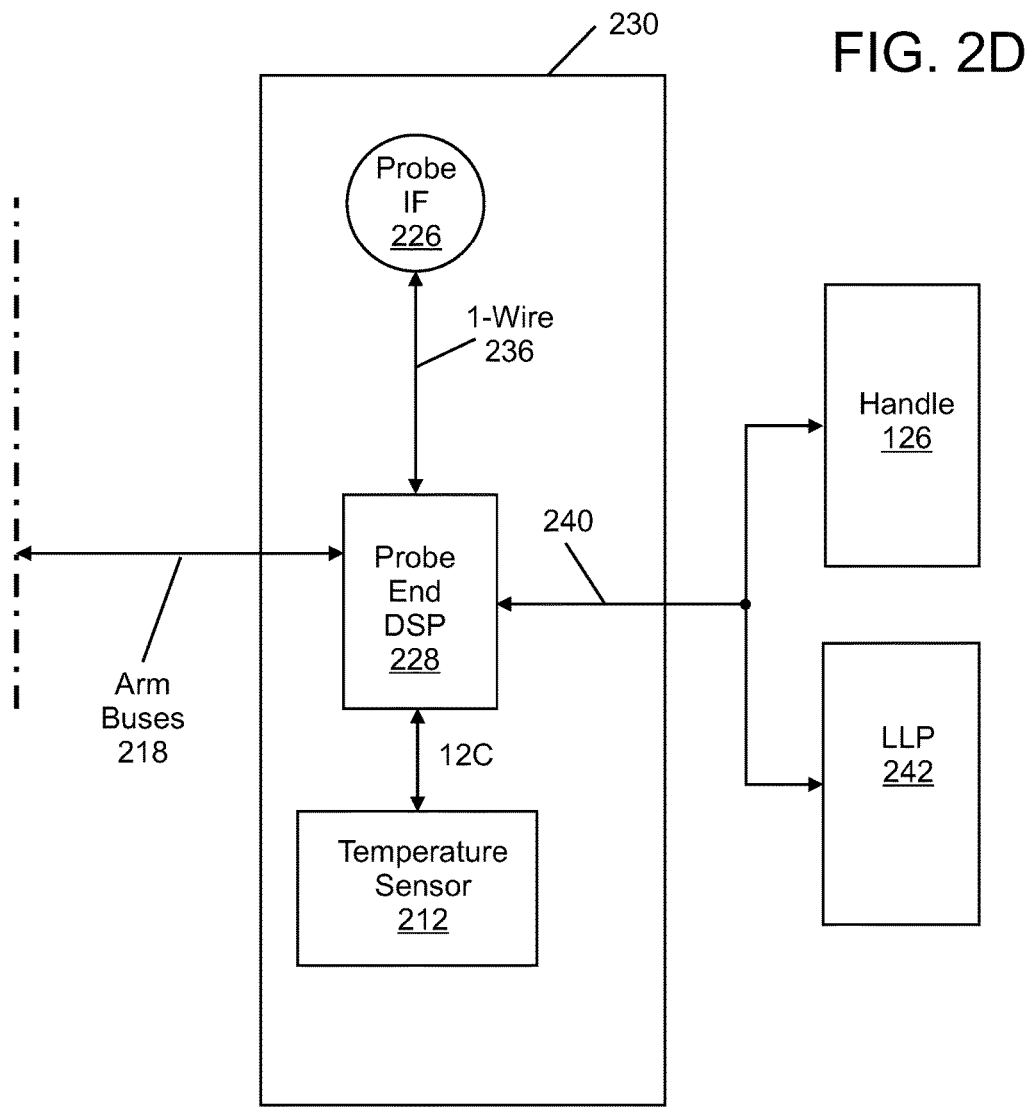
Figure 2:
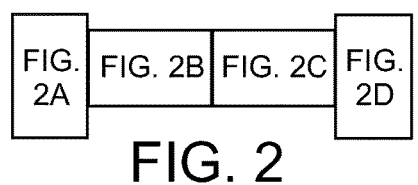

FIG. 2 is a block diagram of electronics utilized in an AACMM 100 in accordance with an embodiment. The embodiment shown in FIG. 2 includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing application software to perform user interface, display, and other functions described herein.

As shown in FIG. 2, the electronic data processing system 210 is in communication with the aforementioned plurality of encoder systems via one or more arm buses 218. In the embodiment depicted in FIG. 2, each encoder system generates encoder data and includes: an encoder arm bus interface 214, an encoder digital signal processor (DSP) 216, an encoder read head interface 234, and a temperature sensor 212. Other devices, such as strain sensors, may be attached to the arm bus 218.

Also shown in FIG. 2 are probe end electronics 230 that are in communication with the arm bus 218. The probe end electronics 230 include a probe end DSP 228, a temperature sensor 212, a handle/LLP interface bus 240 that connects with the handle 126 or the LLP 242 via the quick-connect interface in an embodiment, and a probe interface 226. The quick-connect interface allows access by the handle 126 to the data bus, control lines, and power bus used by the LLP 242 and other accessories, such as a bar coder reader. In an embodiment, the probe end electronics 230 are located in the measurement probe housing 102 on the AACMM 100. In an embodiment, the handle 126 may be removed from the quick-connect interface and measurement may be performed by the laser line probe (LLP) 242 communicating with the probe end electronics 230 of the AACMM 100 via the handle/LLP interface bus 240. In an embodiment, the electronic data processing system 210 is located in the base 116 of the AACMM 100, the probe end electronics 230 are located in the measurement probe housing 102 of the AACMM 100, and the encoder systems are located in the bearing cartridge groupings 110, 112, 114. The probe interface 226 may connect with the probe end DSP 228 by any suitable communications protocol, including commercially-available products from Maxim Integrated Products, Inc. that embody the 1-Wire® communications protocol 236.

Figures 3, 3B:
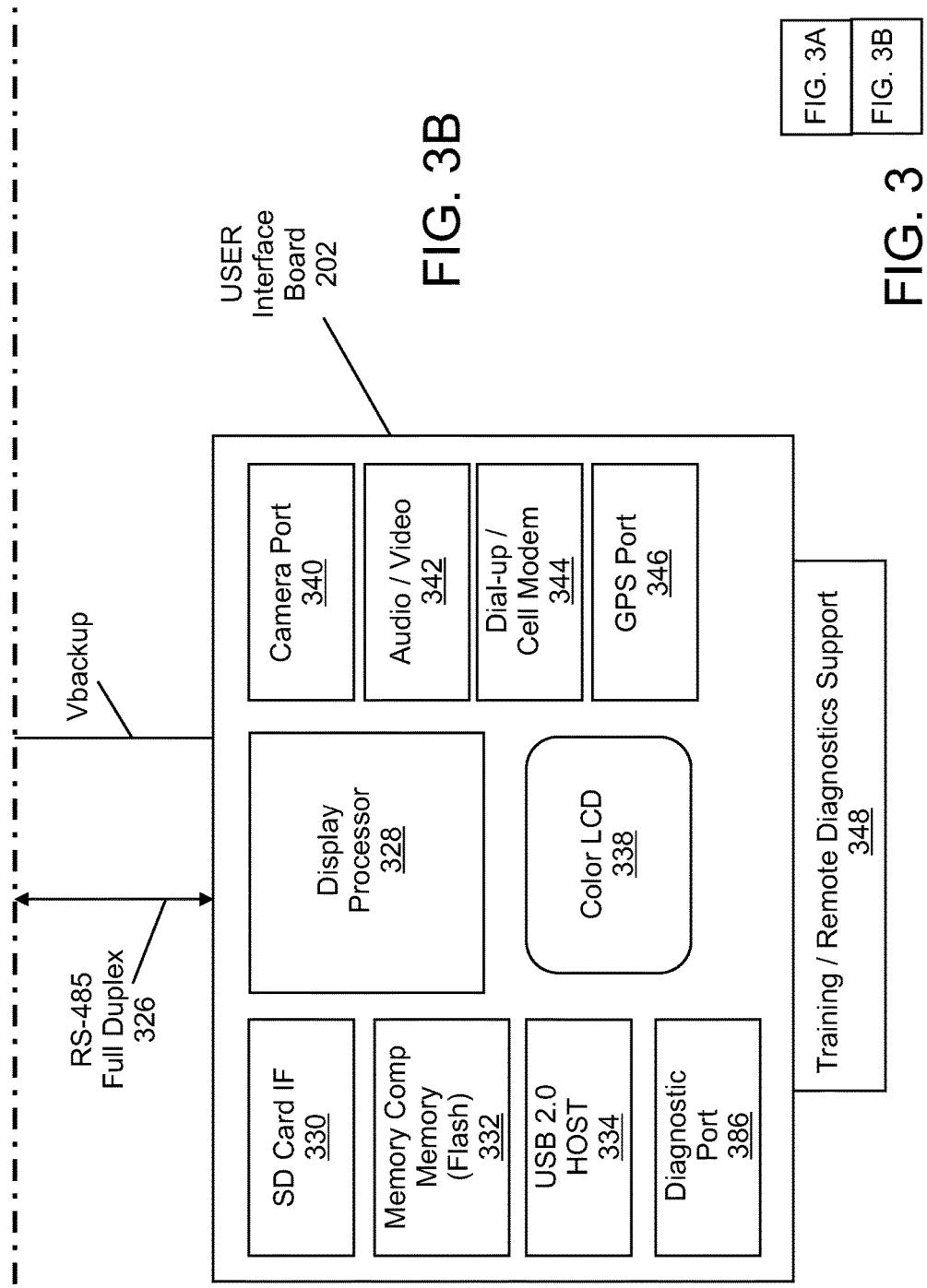
FIG. 3, including FIGS. 3A and 3B taken together, is a block diagram describing detailed features of the electronic data processing system of FIG. 2 in accordance with an embodiment.

FIG. 3 is a block diagram describing detailed features of the electronic data processing system 210 of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

In an embodiment shown in FIG. 3, the base processor board 204 includes the various functional blocks illustrated therein. For example, a base processor function 302 is utilized to support the collection of measurement data from the AACMM 100 and receives raw arm data (e.g., encoder system data) via the arm bus 218 and a bus control module function 308. The memory function 304 stores programs and static arm configuration data. The base processor board 204 also includes an external hardware option port function 310 for communicating with any external hardware devices or accessories such as an LLP 242. A real time clock (RTC) and log 306, a battery pack interface (IF) 316, and a diagnostic port 318 are also included in the functionality in an embodiment of the base processor board 204 depicted in FIG. 3.

The base processor board 204 also manages all the wired and wireless data communication with external (host computer) and internal (display processor 202) devices. The base processor board 204 has the capability of communicating with an Ethernet network via an Ethernet function 320 (e.g., using a clock synchronization standard such as Institute of Electrical and Electronics Engineers (IEEE) 1588), with a wireless local area network (WLAN) via a LAN function 322, and with Bluetooth module 232 via a parallel to serial communications (PSC) function 314. The base processor board 204 also includes a connection to a universal serial bus (USB) device 312. It should be appreciated that the aforementioned bar code scanner may be connected to the AACMM 100 via one or more communications ports, such as but not limited to USB, Ethernet, Bluetooth, or Wi-Fi for example.

The base processor board 204 transmits and collects raw measurement data (e.g., encoder system counts, temperature readings) for processing into measurement data without the need for any preprocessing, such as disclosed in the serial box of the aforementioned '582 patent. The base processor 204 sends the processed data to the display processor 328 on the user interface board 202 via an RS485 interface (IF) 326. In an embodiment, the base processor 204 may also send the raw measurement data to an external computer.

Turning now to the user interface board 202 in FIG. 3, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display (LCD) 338 (e.g., a touch screen LCD) user interface, the user interface board 202 includes several interface options including a secure digital (SD) card interface 330, a memory 332, a USB Host interface 334, a diagnostic port 336, a camera port 340, an audio/video interface 342, a dial-up/cell modem 344 and a global positioning system (GPS) port 346.

The electronic data processing system 210 shown in FIG. 3 also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (I2C) serial single ended bus 354 as well as via a DMA serial peripheral interface (DSPI) 356. The base power board 206 is connected to a tilt sensor and radio frequency identification (RFID) module 208 via an input/output (I/O) expansion function 364 implemented in the base power board 206.

Though shown as separate components, in other embodiments all or a subset of the components may be physically located in different locations and/or functions combined in different manners than that shown in FIG. 3. For example, in an embodiment, the base processor board 204 and the user interface board 202 are combined into one physical board.

Figure 4:
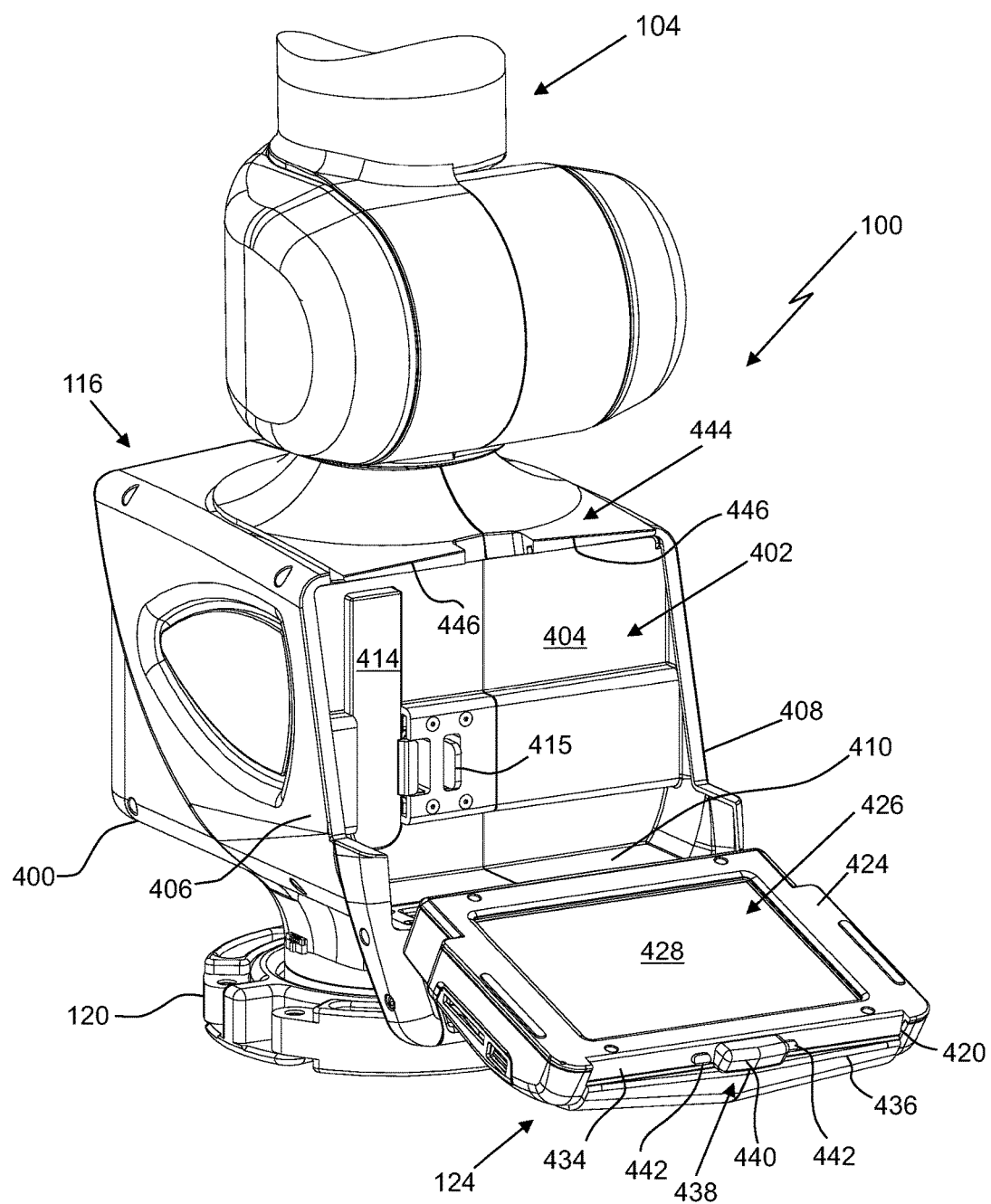
FIG. 4 is a perspective view of the AACMM of FIG. 1 with the display arranged in an open position.

Referring now to FIG. 4, an embodiment is shown of the AACMM 100 having an integrated display 428, which enables the user of the portable AACMM 100 to view various types of data or other information. The AACMM 100 includes the base 116 that includes the electronic data processing system 210 which is arranged to communicate via one or more buses 218 with the encoders associated with the bearing cartridge groupings 110, 112, 114. The base 116 includes a housing 400 with the mounting device 120 on one end and the bearing cartridge grouping 114 and arm portion 104 on an opposite end. On one side, the housing 400 includes a recess 402. The recess 402 is defined by an interior wall 404, a first side wall 406, a second side wall 408 and an end wall 410. The side walls 406, 408 are arranged on an angle relative to the mounting plane of the AACMM 100 such that the recess 402 tapers from the end adjacent the mounting device 120 to the end adjacent the arm portion 104. Adjacent the end wall 410, the housing 400 includes the handle portion 122 (FIG. 1) that is sized to facilitate the carrying of the portable AACMM 100 by the operator.

The housing 400 includes the movable cover portion 124, which includes a housing member 420 mounted to hinges 414. The movable cover portion 124 rotates about an axis between a closed position (FIG. 1A) and an open position (FIG. 4). In the exemplary embodiment, when in the open position, the movable cover portion 124 is arranged at an obtuse angle relative to the interior wall 404. It should be appreciated that the movable cover portion 124 is continuously rotatable and that the open position may be any position at which the operator can access and utilize the display screen 428. On an outside of the housing member 420 one or more indicators 432 may be mounted. The indicators 432 are visible to the operator when the movable cover portion 124 is in the closed position. The indicators 432 provide the operator with a visual indication of the communications status and/or the battery level of the AACMM 100.

A latch 415 may be used to secure a battery within the housing 400. The latch may be movably disposed in the wall 404. The latch 415 may include a tab that engages a surface of the battery to prevent inadvertent removal. The battery may be coupled to the battery pack interface 316 (FIG. 3A) and provides electrical power for the AACMM 100 when the AACMM 100 is not connected to an external power source (e.g. a wall outlet). In an exemplary embodiment, the battery includes circuitry that communicates with the electronic data processing system 210 and transmits signals that may include but are not limited to: battery charge level; battery type; model number; manufacturer; characteristics; discharge rate; predicted remaining capacity; temperature; voltage; and an almost-discharged alarm so that the AACMM can shut down in a controlled manner.

The movable cover portion 124 further includes a face member 424 disposed on one side and coupled to the housing member 420. The face member 424 includes an opening 426 sized to allow the viewing of the display screen 428. The housing member 420 and face member 424 are generally thin wall structures, formed from an injection molded plastic material for example, that define a hollow interior portion. In an embodiment, the housing member 420 or face member 424 may be formed from other materials, including but not limited to steel or aluminum sheet metal for example. On an end opposite the hinges 414, the housing member 420 includes a recessed area 434. Adjacent the recessed area 434 is a projection 436 that provides a handle that facilitates the opening of the movable cover portion 124 when in the closed position. Within the recessed area 434 is a latch member 438, which includes a spring loaded lever 440 coupled to one or more members 442. The members 442 are arranged to move substantially perpendicular to the surface of the recessed area 434 in response to movement of the lever 440. The latch member 438 is positioned such that when the movable cover portion 124 is rotated to the closed position, the lever fits within an opening 444 along the top of the recess 402. Adjacent the opening 444 are a pair of slots 446 sized to receive the member 442. When in the closed position, the slots 446 retain the members 442 and prevent the movable cover portion 124 from accidentally opening. To open the movable cover portion 124, the operator presses on the lever 440 causing the spring loaded members 442 to retract within the housing member 420. Once the members 442 are retracted, the movable cover portion 124 is free to rotate.

Arranged within the movable cover portion 124 is the display screen 428, which is mounted to the face member 424. The display screen 428 provides a user interface that allows the operator to interact and operate the AACMM 100 without utilizing or connecting an external host computer. However, if desired, the portable AACMM 100 may connect with an external computer and the display on that external computer may be used to view date and other information associated with the AACMM 100. The display 448 may display information relative to the operations being conducted with the AACMM 100, such as but not limited to the displaying of data derived from the positional encoders. In one embodiment, the display screen 428 is an LCD screen that can detect presence and location of a touch, such as by the operator's finger or a stylus for example, within the display area. The display screen 428 may comprise a touch sensitive screen having elements for detecting the touch that include but are not limited to: resistive elements; surface acoustic wave elements; capacitive elements; surface capacitance elements; projected capacitance elements; infrared photodetector elements; strain gauge elements; optical imaging elements; dispersive signal elements; or acoustic pulse recognition elements. The display 428 is arranged in bidirectional communication with the user interface board 202 and the base processor board 204 such that actuation of the display 428 by the operator may result in one or more signals being transmitted to or from the display 428.

In an embodiment, the housing member 420 may include one or more computer interfaces located along either or both of the sides of the display screen 428. The interfaces allow the operator to connect the user interface board 202 to an external device, such as but not limited to: a computer; a computer network; a laptop; a barcode reader or scanner; a digital camera; a digital video camera; a keyboard; a mouse; a printer; a personal digital assistant (PDA); or a cellular phone for example. One of the interfaces may comprise a USB host interface and the other interface may comprise a secure digital card interface. As discussed above, the user interface board 202 includes a processor 328 that is arranged in bidirectional communication to accept and transmit signals from the display screen 428 and the electronic data processing system 210.

It should be appreciated that when the movable cover portion 124 is in the open position it is desirable to prevent or minimize impacts on the display screen 428. In the exemplary embodiment, the arm portion 104 is configured such that the position and length of the arm segments 106, 108 do not allow the probe housing 102, a probe tip 118 or the handle 126 to impact the display screen 428 as the probe end of the arm portion 104 is moved about the area adjacent the movable cover portion 124. As such, the travel of the arm portion 104 results in a path that defines an outer periphery of travel for the probe end that results in a gap distance between the closest part of the probe end (e.g., the probe tip 118) and the display screen 428 when the display screen 428 is in an open position. In an embodiment, the movable cover portion 124 is fully open in the open position of the display screen 428. The path is arranged such that as the probe end moves downward (e.g., towards the mounting ring end), the probe end is carried away from the base 116 such that the probe end does not impact or contact the display screen 428. It should be appreciated that providing the gap distance with a distance greater than zero provides an advantage in reducing or eliminating the potential for contact between the display screen 428 and the probe tip 118.

The afore described portable AACMM 100 may comprise any type of multi-axis coordinate measurement machine, including the FARO® EDGE seven—axis articulated arm CMM or the FARO GAGE® six-axis articulated arm CMM—both available from FARO Technologies, Inc. of Lake Mary, Fla. However, any other type or make and model of coordinate measurement machine may be utilized in accordance with various embodiments of the present invention. For example, embodiments of the present invention may comprise a computer-aided manufacturing (CAM) based system that uses structured light. Other machines or devices that may embody the present invention include bridge CMMs, total stations, micrometers, or other types of dimensional metrology equipment.

Figure 5:
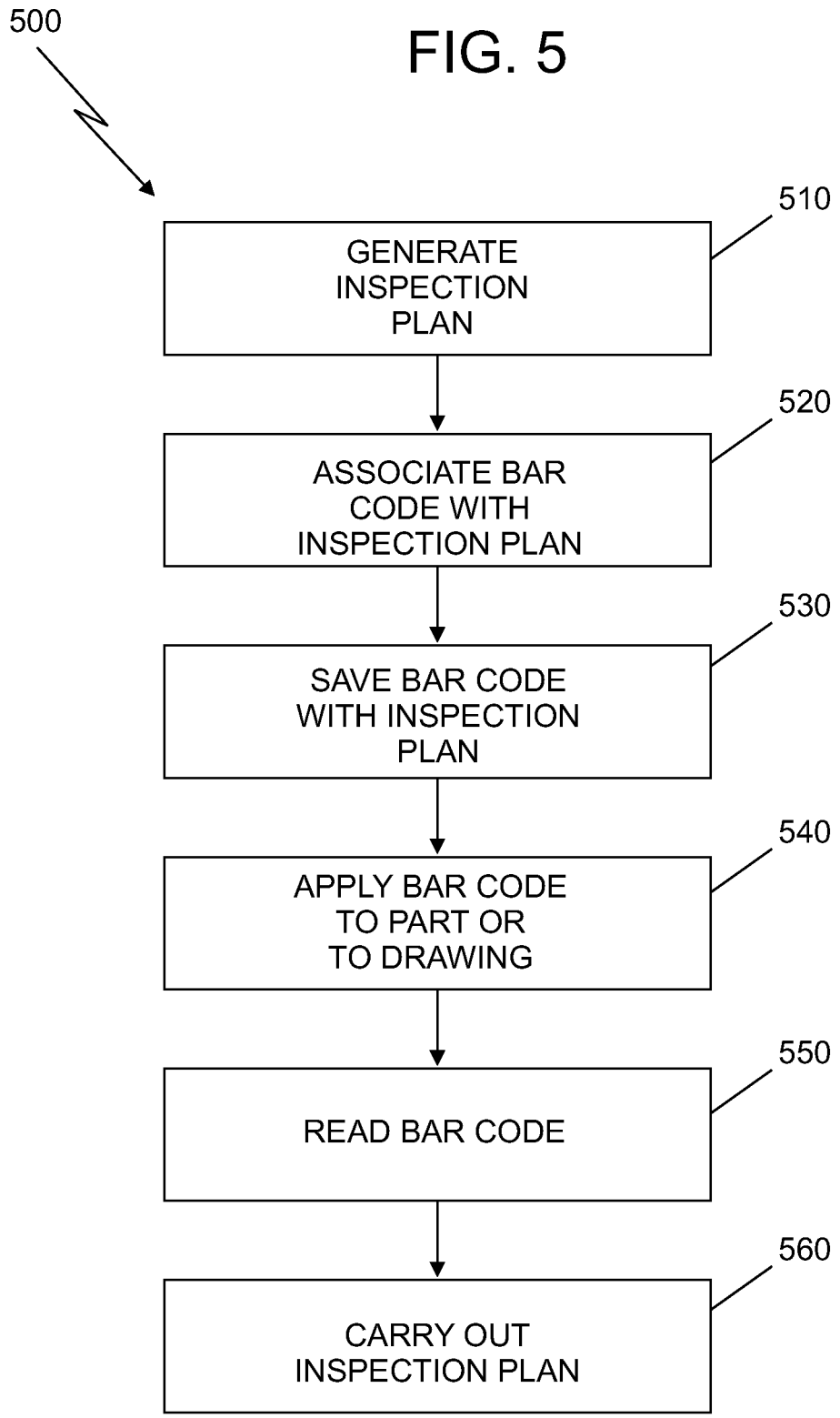
FIG. 5 is a flowchart of various steps in a method according to an embodiment of the present invention for generating an inspection plan for a part to be inspected, for generating a bar code associated with that inspection plan, and for reading the bar code and carrying out the steps in the inspection plan.

Referring now to FIG. 5, there illustrated is a flowchart 500 that shows steps in a method of an embodiment of the present invention. The method may be utilized to generate a measurement or inspection plan for a part or object to be measured by the CMM 100, to assign or associate a bar code with that inspection plan, and to carry out the inspection plan by calling up that plan through use of the bar code assigned to that plan. FIGS. 6-10 illustrate the various steps in the method shown in the flowchart 500 of FIG. 5.

Figure 6:
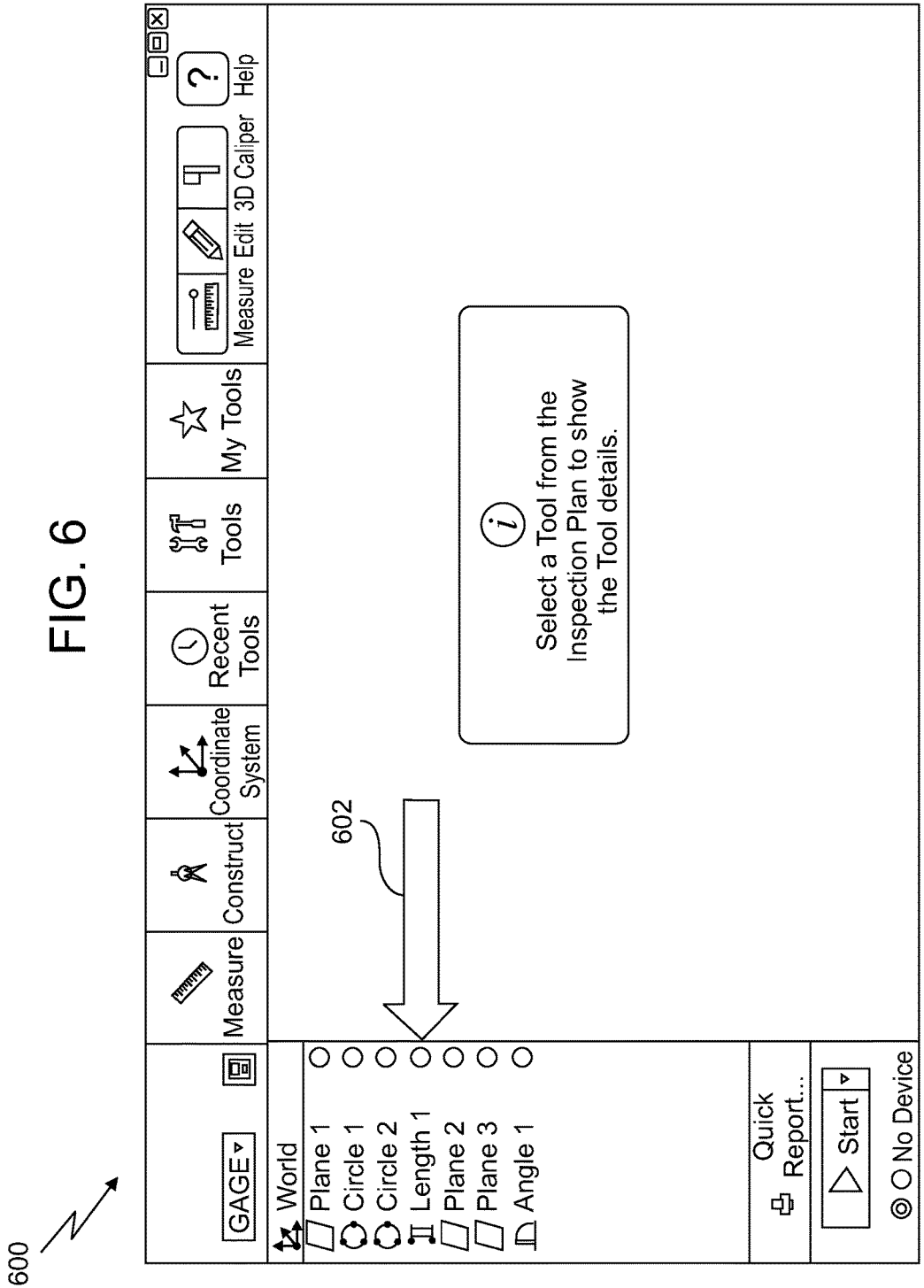
FIG. 6 is a view of a display screen illustrating one step in the method of FIG. 5 showing the generation of an inspection plan for a part to be inspected, according to an embodiment of the present invention.

Referring also to FIG. 6, an inspection plan is generated in a step 510 for the part or object to be measured. The part or object to be measured may be any type of part or object that is manufactured in any way (e.g., by machining). It is commonly desired to measure the manufactured part to determine if certain various physical features of the part satisfactorily meet the desired design dimensions. The FARO GAGE® portable articulated arm CMM is typically used for this express purpose. FIG. 6 illustrates a view 600 on the display screen 428 of the AACMM 100 or on a display screen of an external computer that visually shows a step in the process of generating the inspection plan. The display screen 428 may comprise that described herein above with respect to the portable articulated arm CMM 100 in FIG. 4 in which the display screen 428 is integrated into the CMM 100. In another embodiment, the display screen may comprise the visual display screen in an external computer (e.g., a laptop) connected with the CMM 100 of FIGS. 1-3 described herein above or with some other CMM or other device utilized.

In the example shown in FIG. 6, the CMM 100 may comprise the afore mentioned FARO GAGE® portable articulated arm CMM, which may execute inspection software such as the CAM2® software for example, also available from FARO Technologies, Inc. The CMM executes the inspection software in carrying out the basic functionality of that CMM, including inspection, measurement, and analyzing and comparing measurement data and storing the results and providing the results to the user, for example, visually in several views displayed on a display screen. The inspection software guides the operator or user of the CMM in creating an inspection plan for a particular part or object to be measured or inspected. For example, the part to be measured or inspected is of certain dimensions and may have various physical features formed therein, such as holes, slots, groves, etc. Typically, in creating the inspection plan the user or operator of the portable CMM first sets up the CMM so that it becomes operational. The user then calibrates the probe tip as directed by the software. The user can then check the accuracy of the calibration by measuring the dimensions of one or more calibrated gage blocks.

Once the CMM is calibrated, the user may then determine the accuracy of the various manufactured physical features of the part to be measured or inspected. These features may be called out on the drawing print of the part itself, or may be called out is some other way (e.g., an accompanying part manual). For example, the view 600 of FIG. 6 shows the arrow 602 pointing to one of several physical features (e.g., a length between two features of the part) that the user can select when generating the inspection plan. Other common physical features include diameters of holes, distances and/or angles between features, etc.). As each feature is selected by the user, it is saved in memory as part of the particular inspection plan being generated. As the user systematically proceeds through and selects all the various physical features to be inspected on the part, the features are saved as part of that particular inspection plan.

Figure 7:
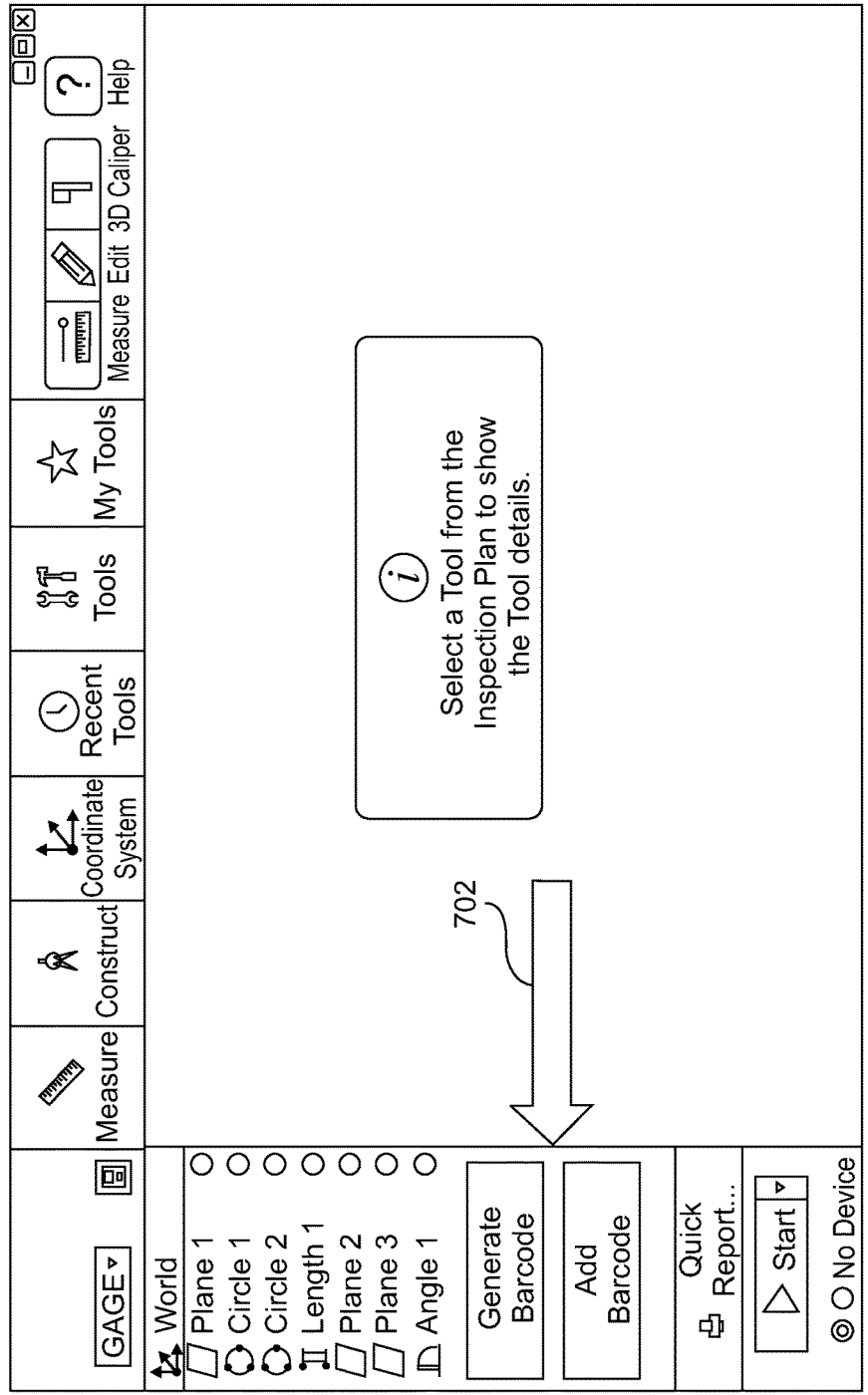
FIG. 7 is a view of a display screen illustrating another step in the method of FIG. 5 showing the assignment of a bar code to the inspection plan generated for the part to be inspected, according to an embodiment of the present invention.

Next, referring also to FIG. 7, there illustrated is another view 700 shown on the display screen in which now the inspection software or other software associated with a CMM instructs the user in a step 520 to associate a bar code with the inspection plan that was just created in the step 510. The bar code can be generated by the inspection software or can already exist and be stored in memory. In the latter case, the bar code may be generated during the design phase of the part, for example, along with the design drawings for that part. As such, the generated bar code can be included on the drawings. The bar code may include the instructions for the inspection plan, or the bar code may act as a pointer to a data file (e.g., stored in memory) that contains the instructions for the inspection plan. The bar code may be generated by other software, such as CAD software, or the bar code may be added on to the drawings by third party software. For example, the bar code may be generated by a machinist along with the CNC program to operate a milling machine. The bar code may further be printed by the software onto media (e.g. an adhesive label) or the part itself.

The bar code can be selected and added by the user to the inspection plan. The inspection software facilitates this step through use of the arrow 702 shown on the view 700 in FIG. 7. The bar code generated or added may comprise any type of machine readable symbol now known or hereinafter developed, including, for example, the well-known two-dimensional (2-D) Aztec code. (ISO/IEC 24778.2008 standard) Other types of 2-D or 3-D machine readable symbols may be utilized. The 2-D Aztec code is capable of supporting a maximum of 1914 bytes of data within the code. Given this relatively large amount of data within the Aztec code, it is possible that not only can the Aztec code store information about an inspection plan for the part, but the Aztec code may also be able to store or contain within itself additional information, such as information about the part or object itself (e.g., various physical characteristics and/or identifying features—model number—of the part or object). As such, the CMM can identify and obtain information about the part solely from the information contained in the bar code.

Figure 8:
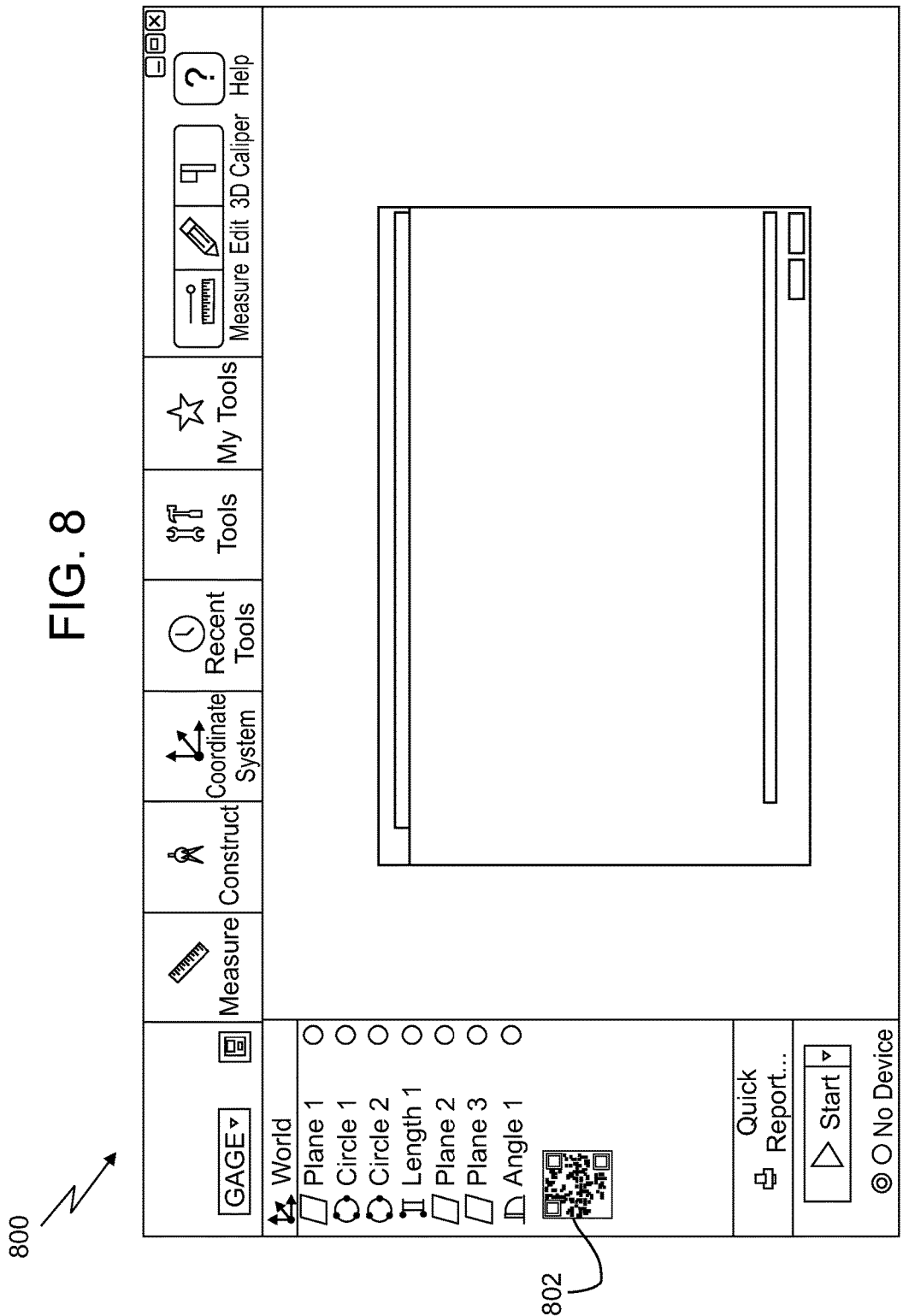
FIG. 8 is a view of a display screen illustrating another step in the method of FIG. 5 showing the bar code assigned to the corresponding inspection plan generated for the part to be inspected, according to an embodiment of the present invention.

Referring also to FIG. 8, there illustrated is another view 800 shown on the display screen in which the generated or selected bar code 802 is shown in the view 800 on the left side thereon. As such, in a step 530 of the method of FIG. 5 the bar code 802 is now saved together with its associated inspection plan previously generated in the step 510; for example the bar code and its inspection plan may be stored together in a file in memory within the CMM and/or in an external computer connected with the CMM.

Figure 9A:
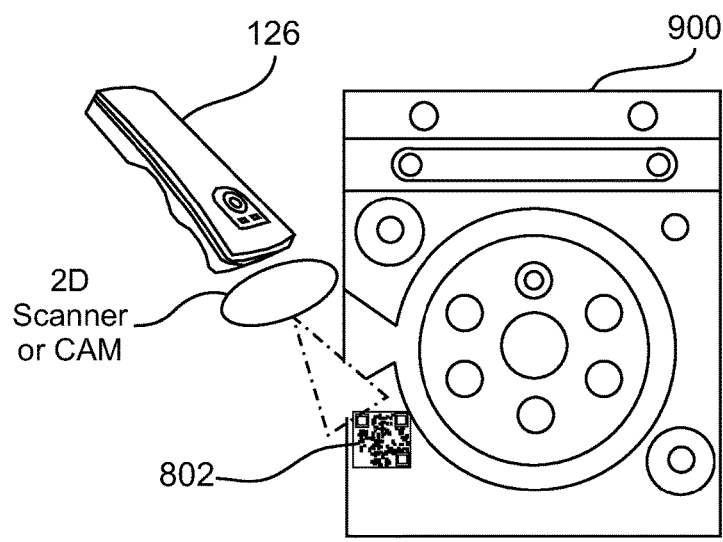
FIGS. 9A and 9B, show the bar code of FIG. 8 located on the part to be inspected (FIG. 9A) and located on a drawing of the part to be inspected (FIG. 9B), in another step of the method of FIG. 5 according to an embodiment of the present invention.
Figure 9B:
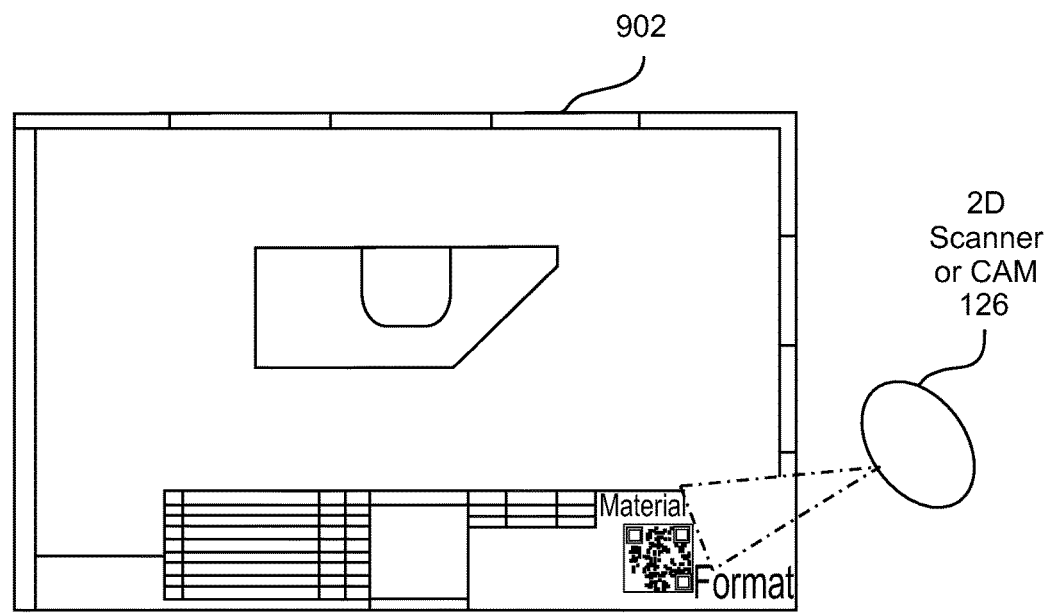

Referring also to FIG. 9, including FIGS. 9A and 9B, there illustrated is the bar code previously generated in the step 510 of the method of FIG. 5 and showing the bar code 802 of FIG. 8 located on a part 900 to be inspected (FIG. 9A) and located on a drawing 902 (e.g., a CAD drawing) of the part 900 to be inspected (FIG. 9B), according to a step 540 in the method 500 of FIG. 5. In FIG. 9A, after the bar code 802 has been generated, it may be applied to the part 900 in various ways; for example, in the form of a sticker that is attached to the part 900 to be inspected (FIG. 9A), or printed directly onto the drawing 902 of the part (FIG. 9B). As discussed herein above, that bar code 802 may contain information about a inspection plan for the part 900. Also, as mentioned herein above, the bar code 802 may contain additional information, for example information about the part itself 900, such as various physical characteristics or identifying features of the part 900.

Nevertheless, once the bar code 802 is associated with a part or with a drawing of a part, a bar code reader or scanner may be utilized to read the bar code 802 in a step 550 of the method of FIG. 5. For example, as mentioned herein above, the bar coder reader may be a part of the portable AACMM 100 of FIGS. 1-4; specifically, the bar code reader may be attached to the CMM 100 in place of the handle 126. However, the bar code reader or scanner is not to be limited as such. Instead, the bar coder reader may be any type of bar coder reader; for example, a hand-held stand-alone reader not associated with any type of coordinate measurement machine. Another example is reading the bar code using a common cell phone or "smartphone" having a camera feature. Still another example is the use of a camera in a laser line probe to read the bar code.

As such, once these readers read or scan the bar code, the reader may then communicate the as-read code to a coordinate measurement machine or other type of measuring device to enable that machine or device to then carry out the inspection plan. The communication of the as-read bar code can take place by various ways, including wired or wireless configurations.

Figure 10:
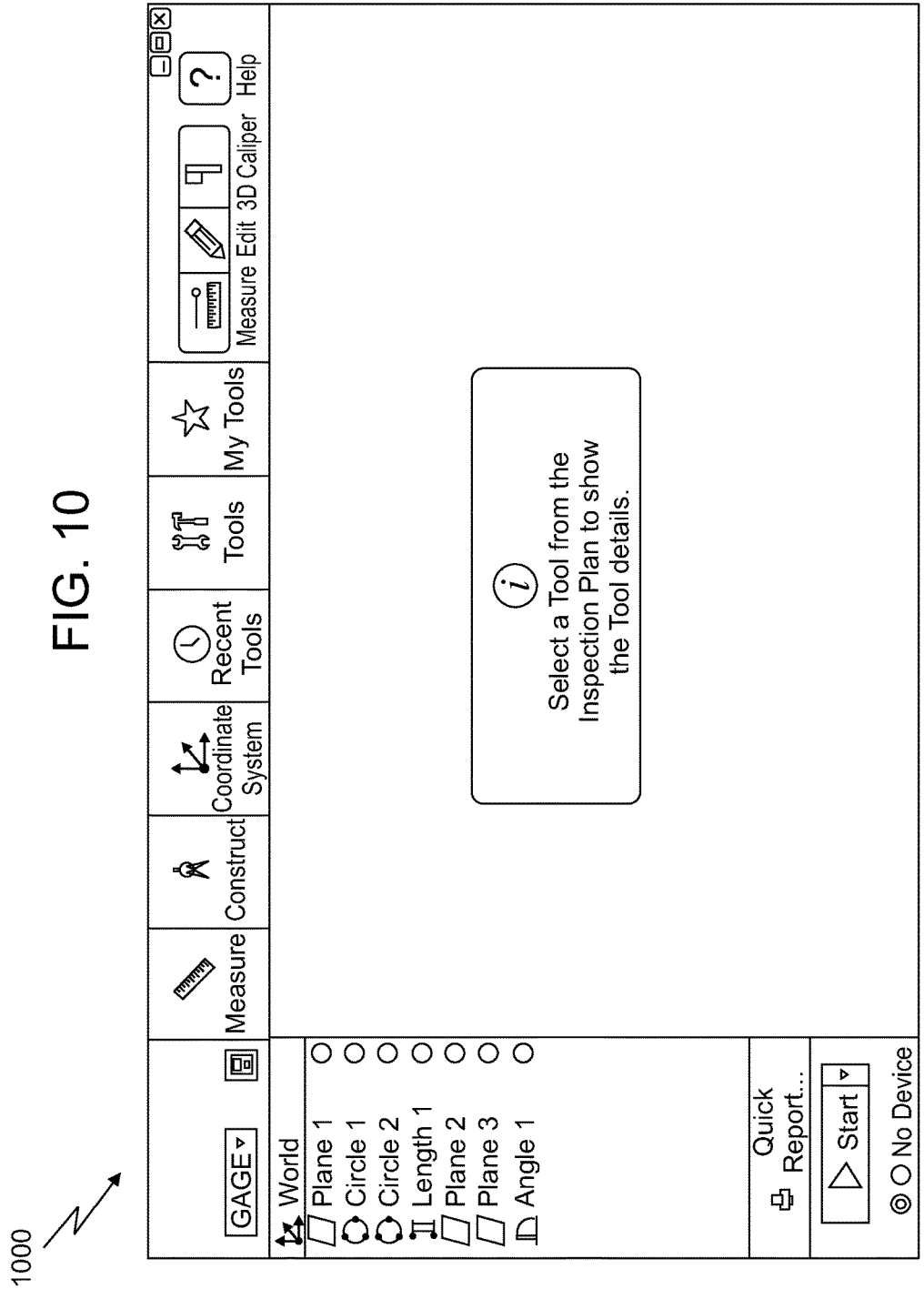
FIG. 10 is a view of a display screen illustrating another step in the method of FIG. 5 showing any one of a plurality of steps to be taken in the inspection plan generated for a part to be inspected, according to an embodiment of the present invention.

Referring to FIG. 10, once the user scans in the bar code 802 from the part itself 900 or from the drawing 902 of the part 900, the machine readable symbol is translated to ascertain the information embedded therein. From this information the associated inspection plan is determined, such as from a database or lookup table for example. The inspection plan opens up in an embodiment; for example, as seen in the view 900 of FIG. 9. The user is then prompted by the inspection software or other software in a step 560 of the method of FIG. 5 to carry out the various steps in the inspection plan.

In an alternative embodiment of the present invention, once the inspection plan has been completed (for example as per the steps outlined in FIGS. 6-10 above) and the actual or "as-built" dimensions of the part or object being inspected have been obtained by, for example, the CMM 100, those actual dimensions may themselves be output as part of a 2-D bar code which may comprise a "sticker" that is attached to the part that was just inspected. This way, those actual dimensions can be utilized later on in various ways; for example, to "custom match" another mating part to the inspected part. More specifically, if the inspected part is on the "high side" in terms of actual dimensions, then another mating part may also be selected having dimensions that are also on the "high side," thereby insuring a relatively better fit together.

In still another embodiment of the present invention, a person (e.g., a mechanic) may take a picture of the bar code on the measured part with, e.g., his cell phone, and an application on the phone displays the actual measured dimensions. This may act as a final confirmation to the mechanic before he installs the part.

Figure 11:
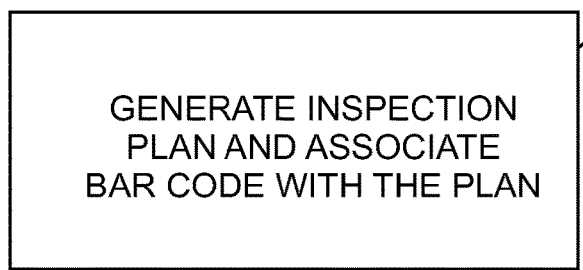
FIG. 11 is a flowchart of various steps in a method according to another embodiment of the present invention for generating an inspection plan for a part to be inspected, for generating a bar code associated with that inspection plan, and for reading the bar code and carrying out the steps in the inspection plan.
Figure 12:
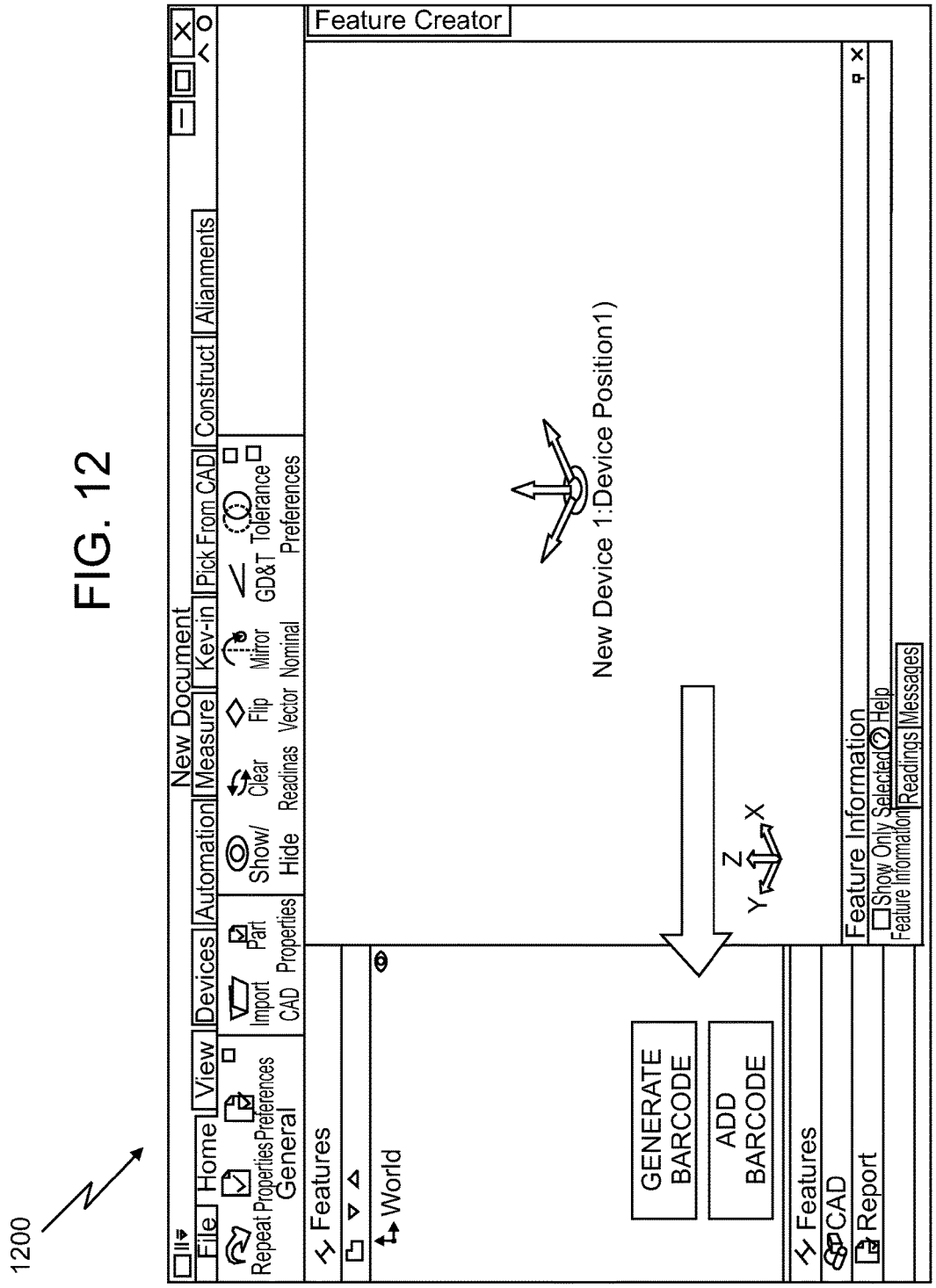
FIG. 12 is a view of a display screen illustrating one step in the method of FIG. 11 showing the generation of an inspection plan for a part to be inspected, according to another embodiment of the present invention.

Referring now to FIG. 11, there illustrated is a flowchart 1100 that shows steps in a method of another embodiment of the present invention. The method may be utilized to generate a measurement or inspection plan for a part or object to be measured by the CMM 100, to assign or associate a bar code with that inspection plan, and to carry out the inspection plan by calling up that plan through use of the bar code assigned to that plan. FIGS. 12-14 illustrate the various steps in the method shown in the flowchart 1100 of FIG. 11.

Referring also to FIG. 12, there illustrated is a view 1200 on the display screen 428 of the AACMM 100 or a display screen of an external computer. The view 1200 visually shows a step in the process of generating the inspection plan and associating a bar code with it. More specifically, the view 1200 shows a step where a user or operator of software either generates a bar code for the inspection plan or adds a bar code to the inspection plan. The software may correspond to CAD-based measurement software, CAD-based construction software, or some other type of software which contains design features of a part or object to be manufactured. The software may run on a CMM or some other type of coordinate measurement machine, or an external computer that can connect with a CMM or coordinate measurement machine. As part of this view 1200, the user may select the various features of the part or object to be inspected or measured. The selected features may then be compiled into a measurement or inspection plan that is represented by the generated or selected bar code. The inspection plan itself may be integrated with the part design file (e.g., the CAD file for the particular part).

Figure 13A:
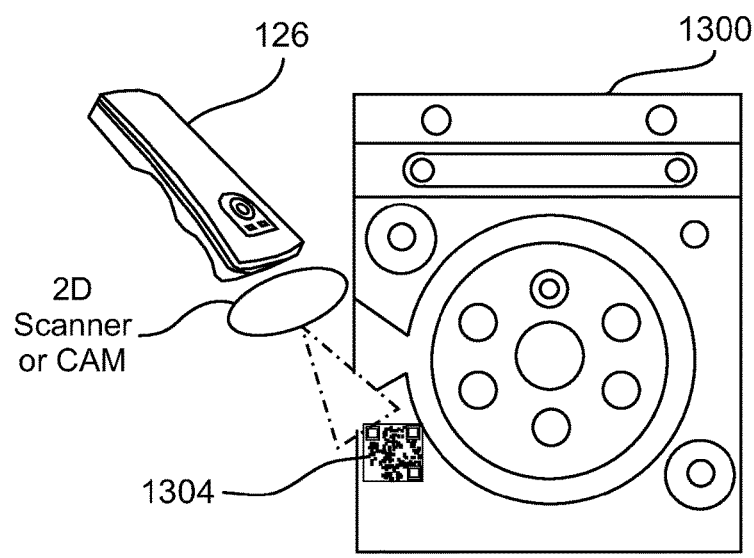
FIGS. 13A and 13B, show the bar code of FIG. 12 located on a part to be inspected (FIG. 13A) and located on a drawing of a part to be inspected (FIG. 13B), in another step in the method of FIG. 11 according to another embodiment of the present invention.
Figure 13B:
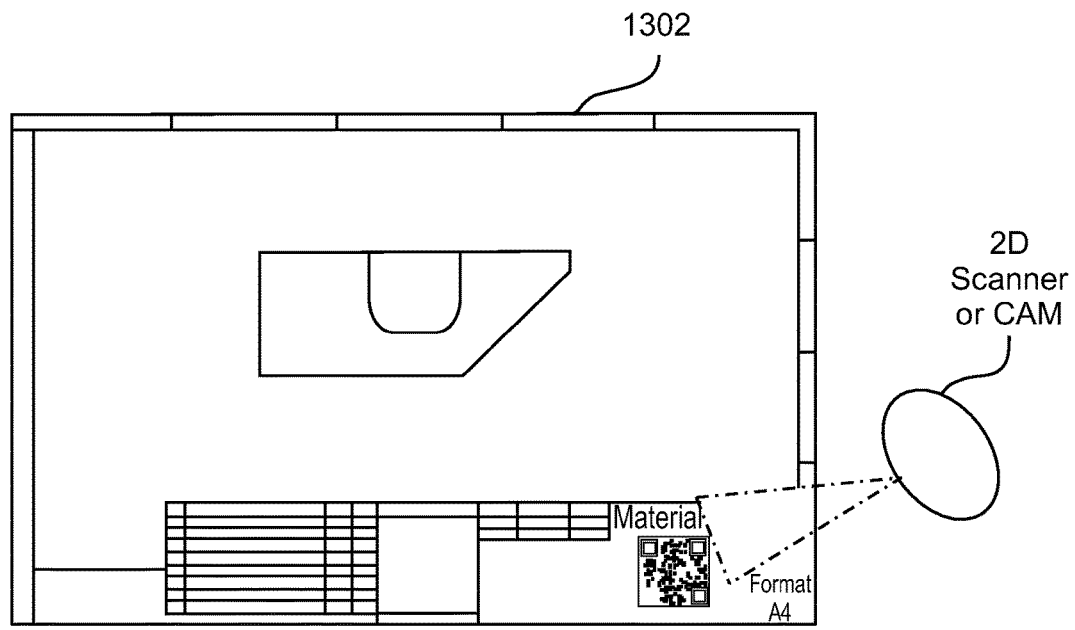
Figure 14:
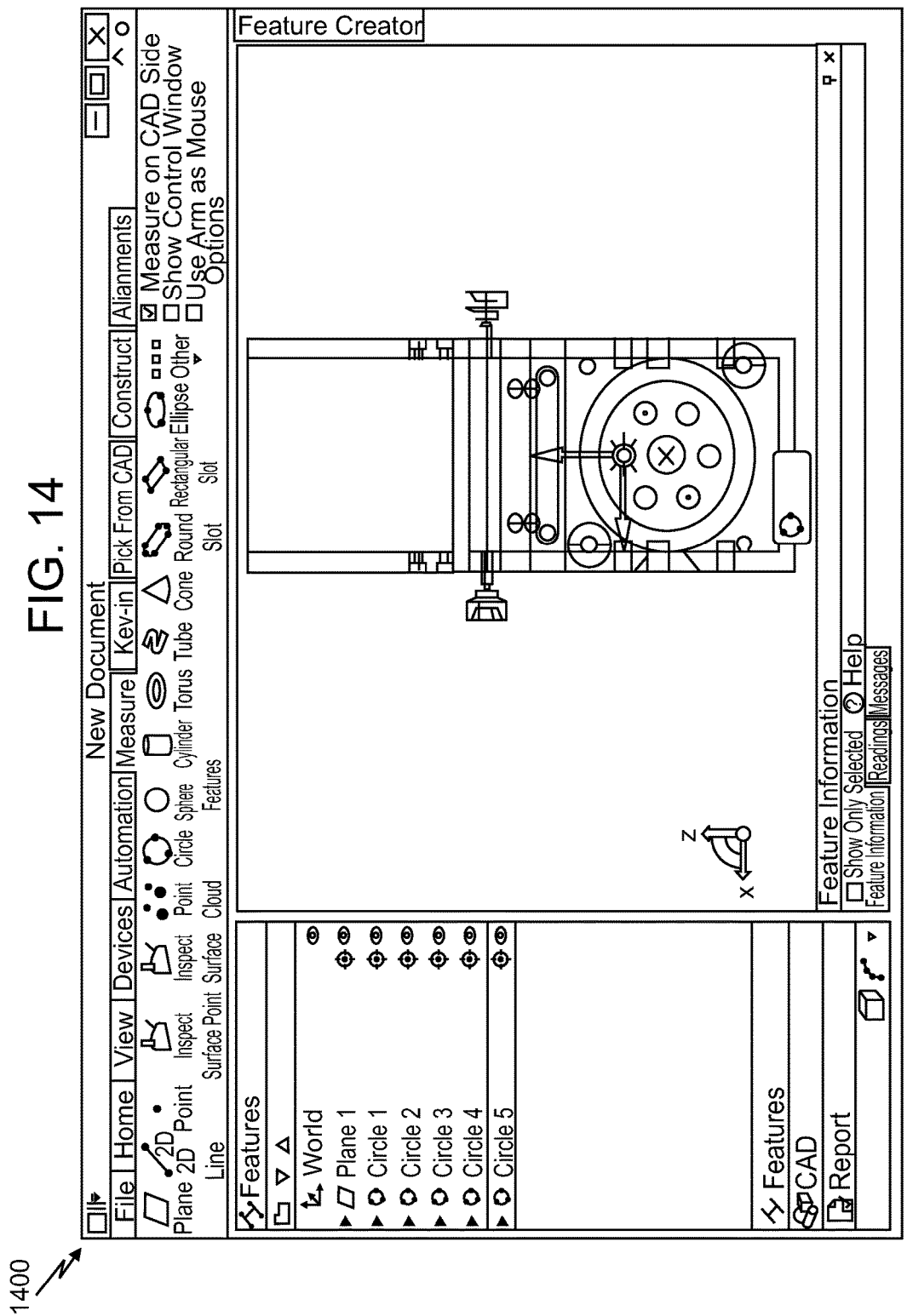
FIG. 14 is a view of a display screen illustrating another step in the method of FIG. 11 showing any one of a plurality of steps to be taken in the inspection plan generated for a part to be inspected, according to an embodiment of the present invention.

Referring also to FIGS. 13A and 13B, there illustrated is the bar code previously generated or selected in FIG. 12 and showing a bar code 1304 located on a part 1300 to be inspected (FIG. 13A) and located on a drawing 1302 (e.g., a CAD drawing) of a part 1300 to be inspected (FIG. 13B), according to a step 1120 in the method of FIG. 11. In FIG. 13A, after the bar code 1104 has been generated, it may be applied to the part 1100, for example, in the form of a sticker attached to the part 1100 to be inspected (FIG. 11A), printed directly onto the drawing 1102 of the part (FIG. 11B) or otherwise affixed to the part (e.g. laser etching or printing the bar code onto the part). As discussed herein above, the bar code 1104 may contain information about a inspection plan for the part 1100 that is part of the CAD file or some other design file for the particular part. Also, as mentioned herein above, the bar code 1104 may contain additional information, for example information about the part itself 1100, such as various physical characteristics or identifying features of the part 1100.

Nevertheless, once the bar code 1104 is associated with a part 1100 or with a drawing 1102 of a part 1100, a bar code reader or scanner may be utilized to read the bar code 1104 in a step 1130 of the method 1100 of FIG. 11. For example, as mentioned herein above, the bar coder reader may be a part of the portable AACMM 100 of FIGS. 1-4; specifically, the bar code reader may be attached to the CMM 100 in place of the handle 126 directly or connected to communicate via the wireless communications ports of the AACMM 100. However, the bar code reader or scanner is not to be limited as such. Instead, the bar coder reader may be any type of bar coder reader; for example, a hand-held stand-alone reader not associated with any type of coordinate measurement machine. As such, once this reader reads or scans the bar code, the reader then would need to communicate the as-read code to a coordinate measurement machine or other type of measuring device to enable that machine or device to then carry out the inspection plan.

Referring also to FIG. 14, once the user scans in the bar code 1104 from the part itself 1100 or from the drawing 1102 the machine readable symbol is translated to determine the embedded information. From this information, the associated inspection plan may be identified. Once identified, the inspection plan opens up in inspection software; for example, as seen in the view 1200 of FIG. 12. The user is then prompted by the software in a step 1140 to carry out the various steps in the inspection plan to ultimately determine if the manufactured part is within the design tolerances for that part.

As mentioned herein above, embodiments of the present invention are not limited for use with portable articulated arm coordinate measurement machines. Instead, embodiments of the present invention may be utilized with other types of measurement machines or devices; for example a laser tracker, which is a common type of part or object measurement machine.

Figure 15:
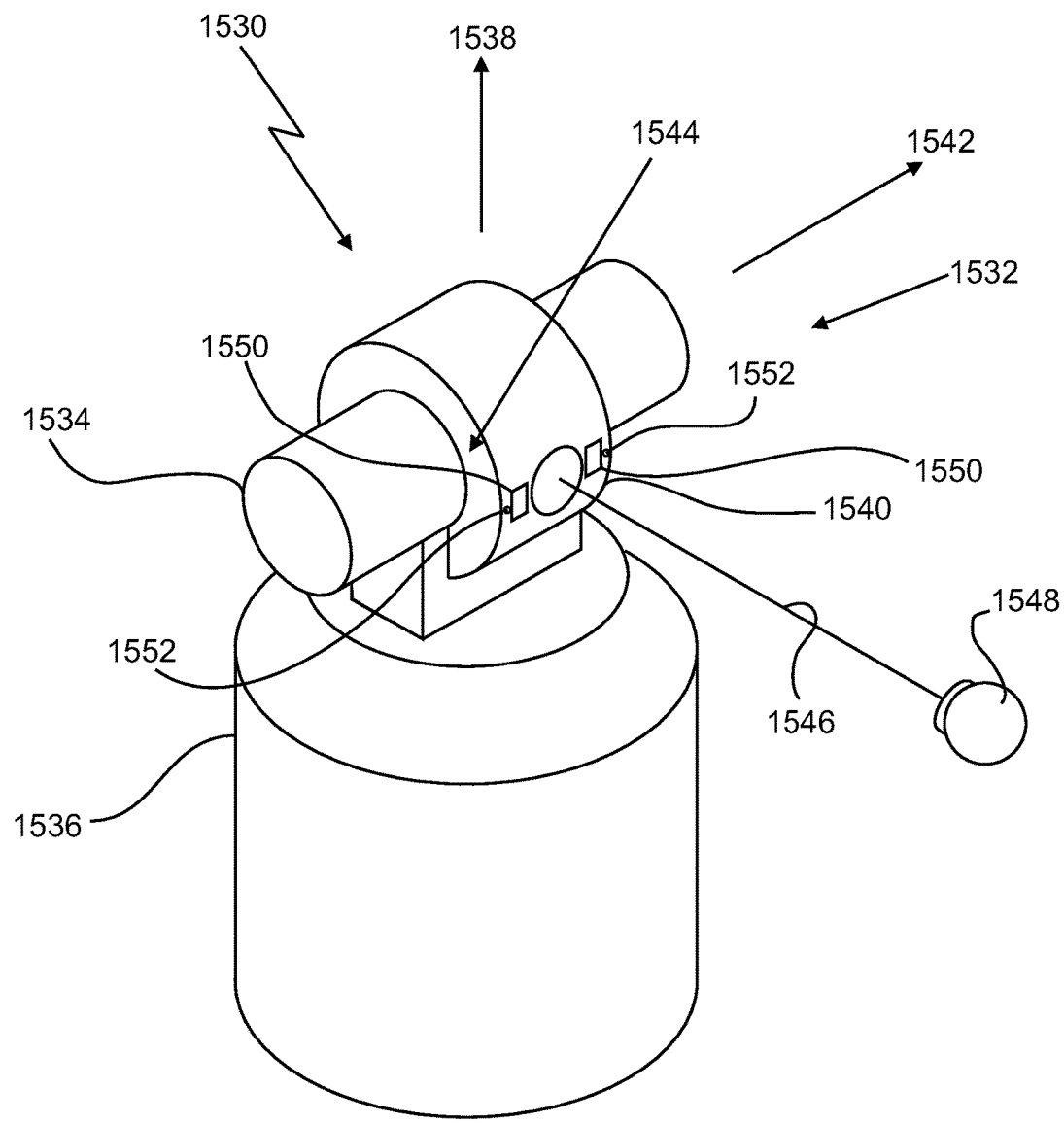
FIG. 15 is a perspective view of a laser tracker according to other embodiments of the present invention.
Figure 16:
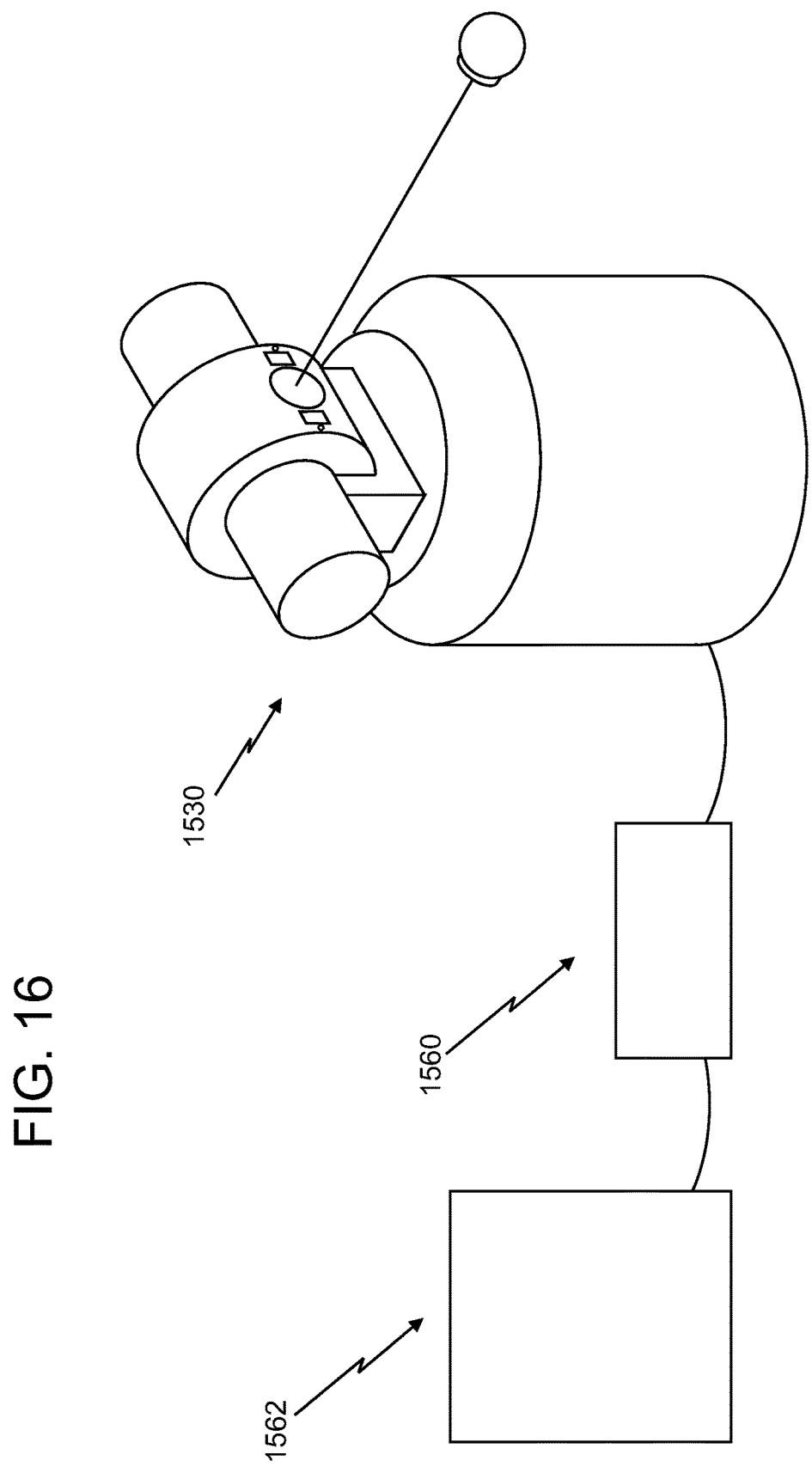
FIG. 16 is a perspective view of the laser tracker of FIG. 15 having computing and power supply elements attached thereto.

Referring now to FIGS. 15 and 16, there illustrated is an embodiment of a laser tracker 1530 that may be utilized in embodiments of the present invention. The laser tracker 1530 includes a gimbaled beam-steering mechanism 1532 that comprises a zenith carriage 1534 mounted on an azimuth base 1536 and rotated about an azimuth axis 1538. A payload 1540 is mounted on the zenith carriage 1534 and is rotated about a zenith axis 1542. The zenith mechanical rotation axis 1542 and the azimuth mechanical rotation axis 1538 intersect orthogonally, internally to the tracker 1530, at a gimbal point 1544, which is typically the origin for distance measurements. A laser beam 1546 virtually passes through the gimbal point 1544 and is pointed orthogonal to the zenith axis 1542. In other words, the laser beam 1546 is in the plane normal to the zenith axis 1542. The laser beam 1546 is pointed in the desired direction by motors (not shown) located within the tracker 1530 that rotate the payload 1540 about the zenith axis 1542 and the azimuth axis 1538. Zenith and azimuth angular encoders (not shown), located internal to the tracker 1530, are attached to the zenith mechanical axis 1542 and to the azimuth mechanical axis 1538, and indicate, to a relatively high degree of accuracy, the angles of rotation. The laser beam 1546 travels to an external target, such as a retroreflector 1548; for example, a spherically mounted retroreflector (SMR). Other types of targets are possible for use with laser trackers; for example, there exist many types of six degree of freedom (6-DOF) probes. By measuring the radial distance between the gimbal point 1544 and the retroreflector 1548 and the rotation angles about the zenith and azimuth axes 1542, 1538, the position of the retroreflector 1548 is found within the spherical coordinate system of the tracker 1530.

The laser beam 1546 may comprise one or more laser wavelengths. For the sake of clarity and simplicity, a steering mechanism of the type shown in FIG. 15 is assumed in the following discussion. However, other types of steering mechanisms are possible. For example, it may be possible to reflect a laser beam off a mirror rotated about the azimuth and zenith axes 1538, 1542. An example of the use of a mirror in this way is disclosed in U.S. Pat. No. 4,714,339 to Lau et al. The techniques described here are applicable, regardless of the type of steering mechanism utilized.

In the laser tracker 1530, one or more cameras 1550 and light sources 1552 are located on the payload 1540. The light sources 1552 illuminate the one or more retroreflector targets 1548. The light sources 1552 may be LEDs electrically driven to repetitively emit pulsed light. Each camera 1550 may comprise a photosensitive array and a lens placed in front of the photosensitive array. The photosensitive array may be a CMOS or CCD array. The lens may have a relatively wide field of view, for example, thirty or forty degrees. The purpose of the lens is to form an image on the photosensitive array of objects within the field of view of the lens. Each light source 1552 is placed near a camera 1550 so that light from the light source 1552 is reflected off each retroreflector target 1548 onto the camera 1550. In this way, retroreflector images are readily distinguished from the background on the photosensitive array as their image spots are brighter than background objects and are pulsed. In an embodiment, there are two cameras 1550 and two light sources 1552 placed symmetrically about the line of the laser beam 1546. By using two cameras 1550 in this way, the principle of triangulation can be used to find the three-dimensional coordinates of any SMR 1548 within the field of view of the camera 1550. In addition, the three-dimensional coordinates of the SMR 1548 can be monitored as the SMR 1548 is moved from point to point. A use of two cameras for this purpose is described in U.S. Published Patent Application No. 2010/0128259 to Bridges.

Other arrangements of one or more cameras 1550 and light sources 1552 are possible. For example, a light source 1552 and a camera 1550 can be coaxial or nearly coaxial with the laser beams 1546 emitted by the tracker 1530. In this case, it may be necessary to use optical filtering or similar methods to avoid saturating the photosensitive array of the camera 1550 with the laser beam 1546 from the tracker 1530.

Another possible arrangement is to use a single camera 1550 located on the payload or base 1540 of the tracker 1530. A single camera 1550, if located off the optical axis of the laser tracker 1530, provides information about the two angles that define the direction to the retroreflector 1548 but not the distance to the retroreflector 1548. In many cases, this information may be sufficient. If the 3-D coordinates of the retroreflector 1548 are needed when using a single camera 1550, one possibility is to rotate the tracker 1530 in the azimuth direction by 180 degrees and then to flip the zenith axis 1542 to point back at the retroreflector 1548. In this way, the target 1548 can be viewed from two different directions and the 3-D position of the retroreflector 1548 can be found using triangulation.

Another possibility is to switch between measuring and imaging of the target 1548. An example of such a method is described in international application WO 03/062744 to Bridges et al. Other camera arrangements are possible and can be used with the methods described herein.

As shown in FIG. 16, an auxiliary unit 1560 is usually a part of the laser tracker 1530. The purpose of the auxiliary unit 1560 is to supply electrical power to the laser tracker body and in some cases to also supply computing and clocking capability to the system. It is possible to eliminate the auxiliary unit 1560 altogether by moving the functionality of the auxiliary unit 1560 into the tracker body. In most cases, the auxiliary unit 1560 is attached to a general purpose computer 1562. Application software loaded onto the general purpose computer 1562 may provide application capabilities such as reverse engineering. It is also possible to eliminate the general purpose computer 1562 by building its computing capability directly into the laser tracker 1530. In this case, a user interface, preferably providing keyboard and mouse functionality is built into the laser tracker 1530. The connection between the auxiliary unit 1560 and the computer 1562 may be wireless or through a cable of electrical wires. The computer 1562 may be connected to a network, and the auxiliary unit 1560 may also be connected to a network. Plural instruments, for example, multiple measurement instruments or actuators, may be connected together, either through the computer 1562 or the auxiliary unit 1560.

Use of embodiments of the laser tracker 1530 of FIGS. 15 and 16 in embodiments of the present invention typically involve use of the one or more cameras 1550 on the laser tracker 1530 to read or scan a bar code that may be placed on a target (e.g., the SMR 1548) or on drawings of a part to be inspected. The software used to read, translate and interpret the machine readable symbol can be stored in the tracker body itself, in the auxiliary unit 1560, or in the computer 1562. That is, similar to the embodiments discussed herein above with respect to the portable AACMMs, the laser tracker 1530 may contain software that allows a user to create an inspection plan for a part or object to be measured or inspected by the laser tracker. The software may then allow the user to generate or select a bar code that identifies the associated inspection plan. The bar code may then be placed on the target 1548 or on a drawing that illustrates the part, and the laser tracker 1530 may then utilize one or more of its cameras 1550 to read the bar code and then carry out the corresponding inspection plan.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for inspecting an object, the method comprising:
providing an articulated arm coordinate measuring machine (AACMM) having a base; a manually positionable arm portion having opposed first and second ends, the second end of the arm portion being coupled to the base, the arm portion including a plurality of connected arm segments, each arm segment including at least one position transducer for producing a position signal; a measurement device coupled to the first end of the arm portion; and an electronic circuit which receives the position signal from the at least one position transducer and provides data corresponding to a position of the measurement device;

providing a display;

providing a bar-code reader;

generating an inspection plan, the inspection plan being a series of steps to be performed by an operator using the articulated arm coordinate measuring machine, the series of steps including a first plurality of measurements by the articulated arm coordinate measuring machine to determine a diameter of a hole in the object;

generating a bar code, the bar code including a collection of machine readable symbols that describe each of the series of steps of the inspection plan;

reading the generated bar code with the bar-code reader to obtain inspection plan data;

sending the inspection plan data from the bar-code reader to a processor;

sending a signal from the processor to the display, the signal based at least in part on the inspection plan data;

receiving the signal by the display and providing on a display screen of the display a visual indication of each step from among the series of steps to be performed by the operator with at least one step being performed with the AACMM as a part of the inspection plan;

performing each step from among the series of steps by the operator;

wherein the at least one step includes measuring the diameter of the hole in the object with the measurement device of the articulated arm coordinate measuring machine in response to the first plurality of measurements performed by the operator;

determining whether the diameter of the hole is within a design tolerance; and storing the diameter.

2. The method of claim 1 wherein the bar code is compliant with the ISO/IEC 24778.2008 standard.

3. The method of claim 1 further comprising affixing the bar code to the object.

4. The method of claim 1 affixing the bar code to a drawing of the object.

5. The method of claim 1 wherein, in the step of providing a display, the display is integrated into the articulated arm coordinate measuring machine.

6. The method of claim 1 further comprising:

generating a second machine readable information symbol in response to measuring the at least one part characteristic, the second machine readable information symbol including information on the measurement of the at least one part characteristic; and affixing the second machine readable information symbol to the part.

7. The method of claim 6 further comprising matching the part with another part using the information on the second machine readable information symbol.

8. The method of claim 6 further comprising:

capturing an image of the second machine readable information symbol; and displaying the information on the second machine readable information symbol.

9. The method of claim 8 wherein the displayed information includes the measurement of the at least one part characteristic.

10. The method of claim 9 wherein the step of capturing the image includes capturing the image with a cellular phone.

11. The method of claim 1 further comprising providing a bar code coupled to the arm portion adjacent the first end.

12. The method of claim of claim 1 wherein the first machine readable information symbol includes information on a location of a data file that contains the generated inspection plan.

13. The method of claim 1 wherein the first machine readable symbol includes information about the part.

14. The method of claim 13 wherein the information about the part includes at least one of physical characteristics of the part, identifying features of the part and a model number of the part.

15. The method of claim 1 wherein the first machine readable information symbol is a 3D machine readable symbol.

16. The method of claim 1 further comprising:

providing a laser line probe operably coupled to the AACMM, the laser line probe having a camera; and reading the first machine readable information symbol with the camera.

17. The method of claim 1 wherein the step of generating the inspection plan includes integrating the generated inspection plan into a part design file.

18. The method of claim 17 wherein the part design file is a computer aided design file.

19. The method of claim 3 wherein the step of affixing the bar code to the part includes printing the bar code onto the part.

20. The method of claim 3 wherein the step of affixing the bar code to the part includes laser etching the bar code onto the part.

* * * * *